US010064424B2

(12) United States Patent
Storek et al.

(10) Patent No.: US 10,064,424 B2
(45) Date of Patent: Sep. 4, 2018

(54) FOOD MOVEMENT AND CONTROL WITHIN A CONTAINER FOR FOOD PREPARATION

(71) Applicant: LEGUPRO AB, Gothenburg (SE)

(72) Inventors: David Storek, Gothenburg (SE); Robert P. Otillar, Mountain View, CA (US); Antonia L. Sequeira, Mountain View, CA (US)

(73) Assignee: LEGUPRO AB, Gothenburg (SE)

( * ) Notice: Subject to any disclaimer, the term of this patent is extended or adjusted under 35 U.S.C. 154(b) by 2 days.

(21) Appl. No.: 15/230,302

(22) Filed: Aug. 5, 2016

(65) Prior Publication Data

US 2016/0338539 A1  Nov. 24, 2016

Related U.S. Application Data

(63) Continuation of application No. 14/238,723, filed as application No. PCT/US2012/051510 on Aug. 17, 2012, now Pat. No. 9,445,614.

(Continued)

(51) Int. Cl.
*A23L 5/10* (2016.01)
*B05C 3/10* (2006.01)
(Continued)

(52) U.S. Cl.
CPC . *A23L 5/13* (2016.08); *A23L 5/11* (2016.08); *A23L 5/55* (2016.08); *A23L 11/00* (2016.08); *A23L 11/01* (2016.08); *A23L 11/10* (2016.08); *A47J 27/12* (2013.01); *A47J 36/32* (2013.01); *A47J 37/106* (2013.01); *A47J 37/1219* (2013.01); *A47J 37/1228* (2013.01); *B05C 3/02* (2013.01); *B05C 3/10* (2013.01); *A23V 2002/00* (2013.01)

(58) Field of Classification Search
CPC ... A23L 5/13; A23L 5/55; A23L 11/01–11/03; A23L 5/11; A23L 11/10; A47J 27/10; A47J 37/1219; A47J 37/1266; A47J 37/106; A47J 27/12; A47J 36/32; A47J 37/1228; B05C 3/02; B05C 3/10; A23N 12/02; A23N 12/04
USPC .......... 426/634, 640, 507–508, 523; 99/403–418
See application file for complete search history.

(56) References Cited

U.S. PATENT DOCUMENTS 1,310,495 A * 7/1919 Ford .................. A47J 37/1214
134/58 R
1,774,110 A * 8/1930 Sloat ................... A23L 11/03
34/340

(Continued)

*Primary Examiner* — Drew E Becker
(74) *Attorney, Agent, or Firm* — Fenwick & West LLP

(57) ABSTRACT

An apparatus and method for controlling the movement of a food product in a container is described. The apparatus can be cleanable, portable, and fully automated. It can include a main container for holding the food product and one or more other containers for holding a substance, such as liquid. The main container can be moved between the one or more other containers so that the food product is immersed in the substance (e.g., liquid) in the one or more other containers. Any of the containers can be heated to heat the food product. This movement of the main container can be used run fully automated cycles (e.g., sprouting, rinsing, soaking, cooking, cleaning, etc.) that do not require user interaction.

20 Claims, 9 Drawing Sheets

Related U.S. Application Data

(60) Provisional application No. 61/524,767, filed on Aug. 18, 2011, provisional application No. 61/658,879, filed on Jun. 12, 2012.

(51) Int. Cl.

| | | |
|---|---|---|
| *A47J 37/10* | (2006.01) | |
| *B05C 3/02* | (2006.01) | |
| *A47J 37/12* | (2006.01) | |
| *A23L 11/10* | (2016.01) | |
| *A23L 5/00* | (2016.01) | |
| *A23L 11/00* | (2016.01) | |
| *A47J 36/32* | (2006.01) | |
| *A47J 27/12* | (2006.01) | |

(56) References Cited

U.S. PATENT DOCUMENTS

| | | | | |
|---|---|---|---|---|
| 2,135,593 A * | 11/1938 | Nohe | ........................ | A23L 11/03 426/438 |
| 2,522,409 A * | 9/1950 | Stoller | .................... | A01G 31/00 426/482 |
| 2,584,150 A * | 2/1952 | Morris | ..................... | A23L 11/01 426/441 |
| 4,601,910 A * | 7/1986 | Saub | ........................ | A23L 11/03 426/482 |
| 4,900,578 A * | 2/1990 | Bakker | .................. | A23B 7/0441 426/508 |
| 5,863,591 A * | 1/1999 | Seguin | ....................... | A23L 5/30 426/507 |
| 6,602,534 B1 * | 8/2003 | Rose | ........................ | A23L 11/31 426/507 |
| 6,904,969 B2 * | 6/2005 | Mueller | ................. | A47J 39/006 165/254 |
| 2003/0192435 A1 * | 10/2003 | McNair | .................. | A47J 27/004 99/330 |
| 2008/0008805 A1 * | 1/2008 | Wang | .................... | A23C 11/103 426/518 |
| 2010/0255168 A1 * | 10/2010 | Roth | ........................ | A47J 27/04 426/510 |
| 2011/0117259 A1 * | 5/2011 | Storek | ..................... | A47J 36/14 426/509 |

* cited by examiner

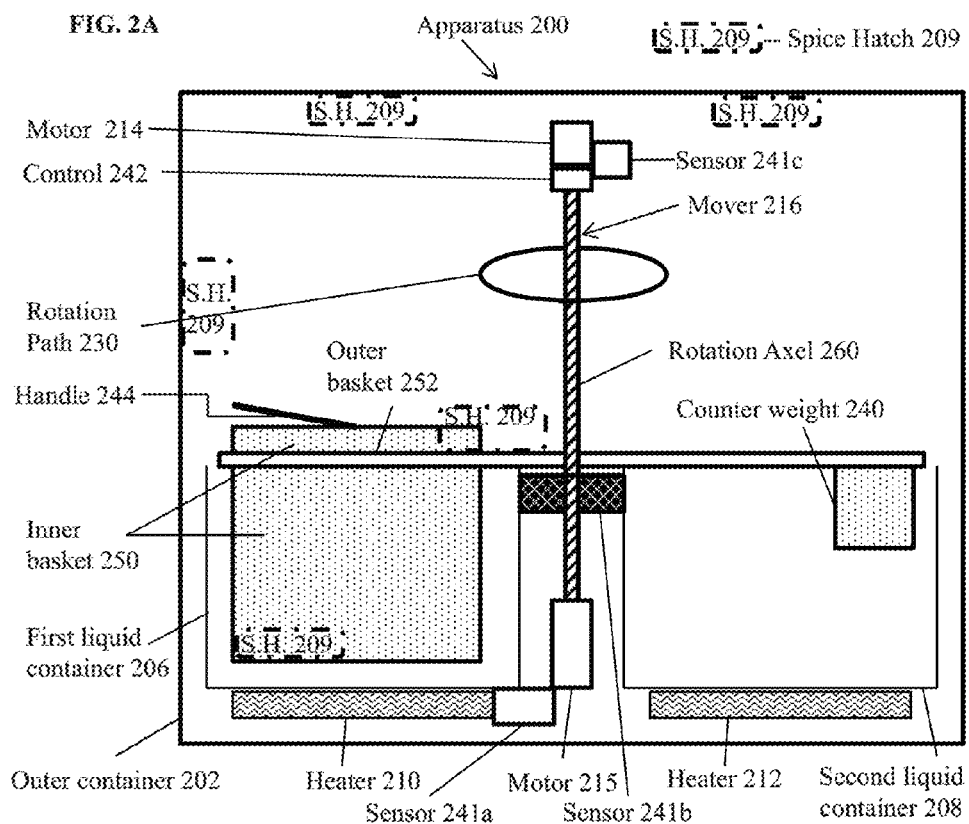
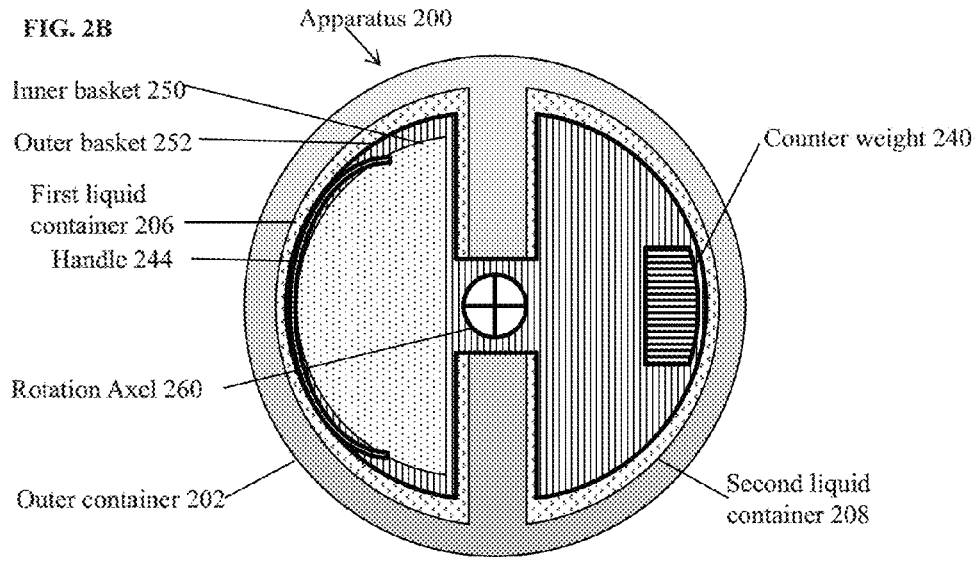

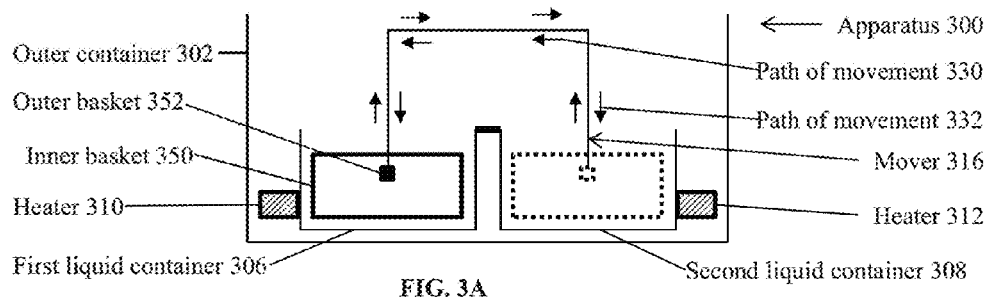
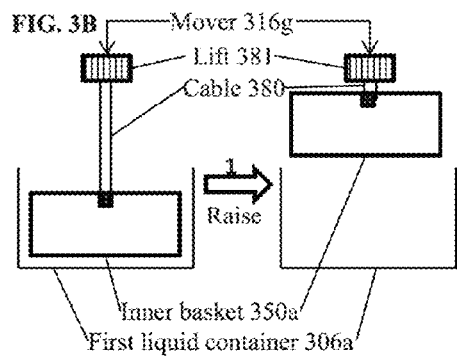
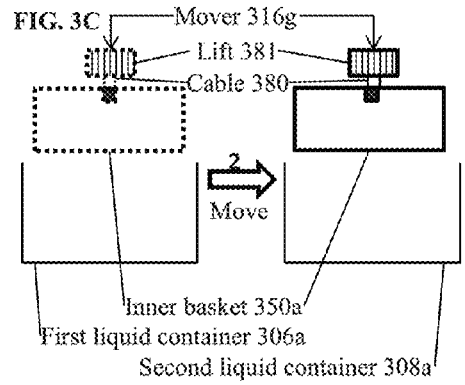
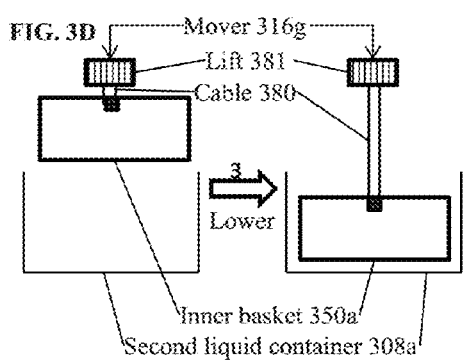
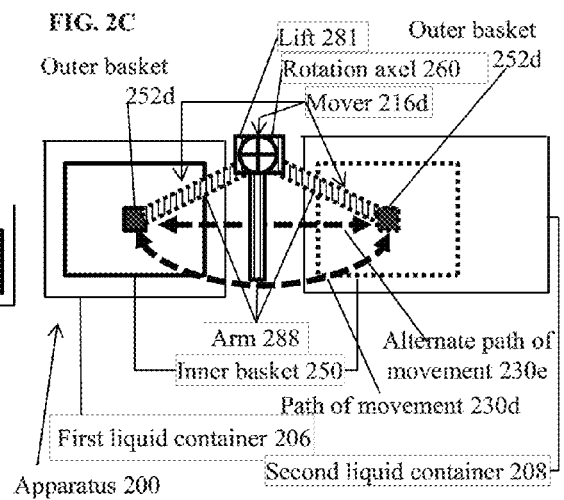

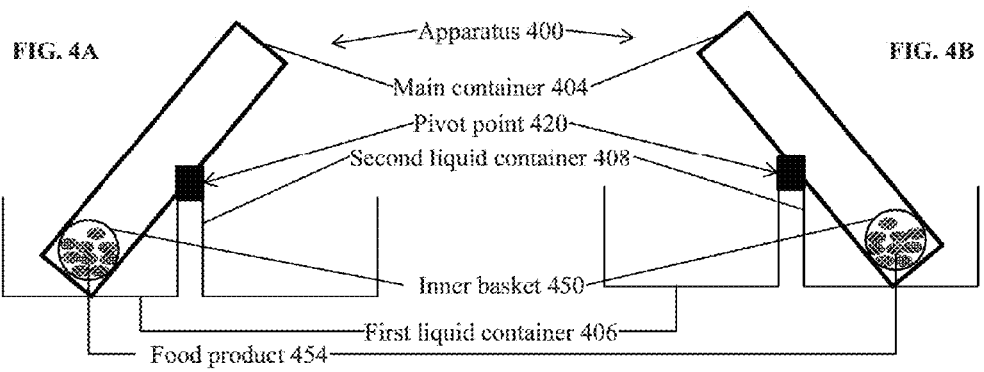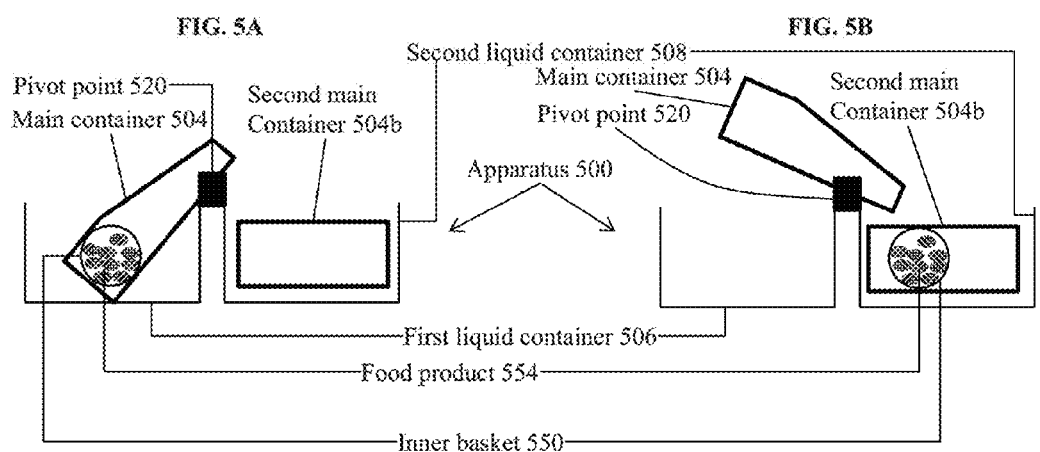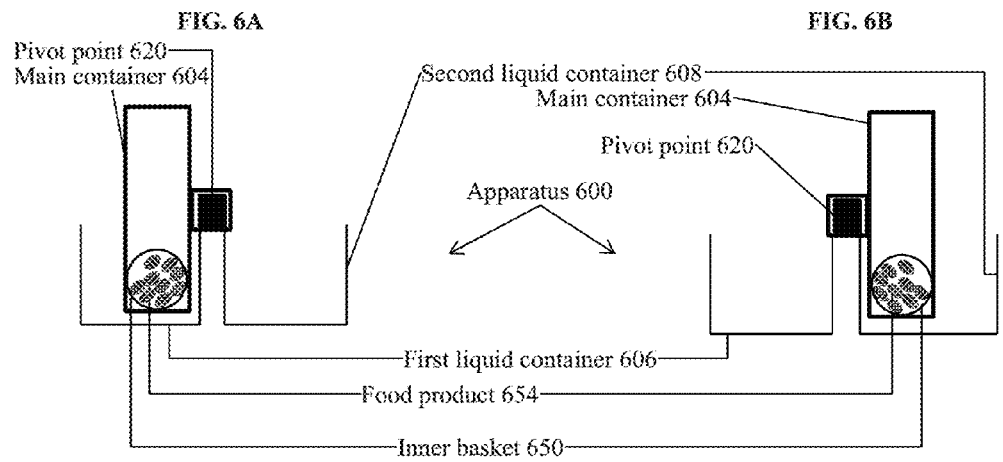

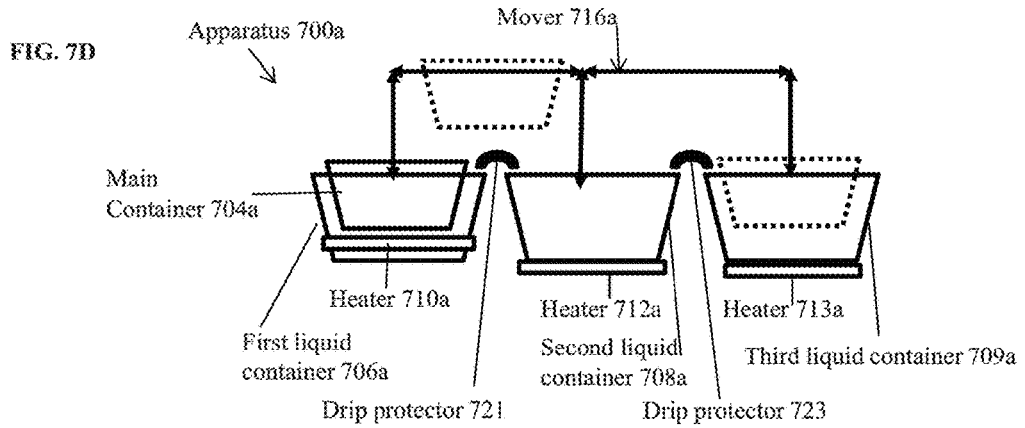
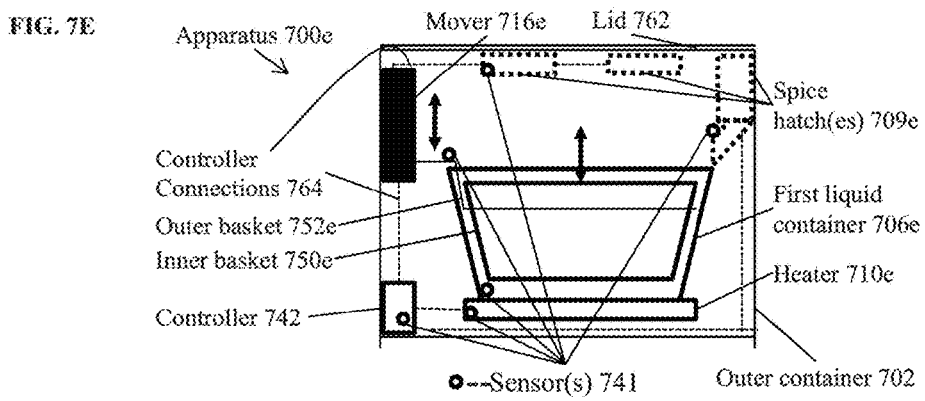
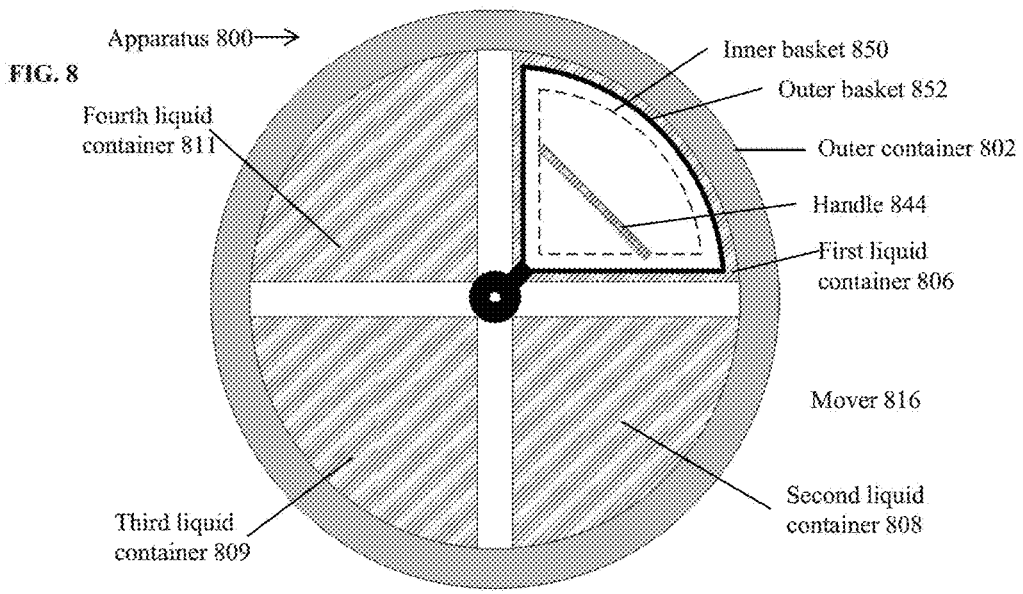

FOOD MOVEMENT AND CONTROL WITHIN A CONTAINER FOR FOOD PREPARATION

RELATED APPLICATIONS

This application is a continuation of U.S. patent application Ser. No. 14/238,723, filed on Feb. 12, 2014 (now issued as U.S. Pat. No. 9,445,614), which is a national phase application of PCT/US2012/051510, filed on Aug. 17, 2012, which claims the benefit of U.S. Provisional Application No. 61/524,767, filed on Aug. 18, 2011 and U.S. Provisional Application No. 61/658,879, filed on Jun. 12, 2012, which are incorporated herein by reference in their entireties for all purposes.

BACKGROUND OF THE INVENTION

Field of the Invention

This invention pertains in general to a container for controlling movement of foods, and more specifically to an apparatus for preparing and cooking food products using a moveable container.

Description of the Related Art

While many kitchen tasks have been automated, there are still some unmet needs that have long been a problem in the household food-preparation/cooking world. For example, preparing and cooking dry beans is a notoriously laborious process that can requires hours, if not days, and includes many steps requiring the cook's presence. Dry, unprocessed beans must often first be rinsed and then soaked in fresh liquid, and the soaking can commonly take hours (e.g., 4 to 8 hours or overnight; soybeans may require soaking 12 hours or more). Commonly, the soaking water is then drained and the beans are then cooked in fresh water (often in a pot on the stove for e.g., 1 to 2 hours). Since salt can affect the cooking, addition of salt can be at controlled times in the cooking process. Further, some users prefer to first sprout the beans to increase the health benefit and nutritional value of beans. To sprout dry beans, the cook typically lays the dry beans out in a container with enough water to keep them moist and carefully monitors the water level to avoid drying out or over soaking. Typically, the beans sit for 3 or 4 days, with temperature and lighting conditions monitored to ensure proper sprouting. Thus, multiple labor-intensive steps for cooking and/or sprouting that require the user to return to the kitchen and take action, all the while carefully managing the temperature and environment of the beans.

Currently, there is no device that can perform all or even most of these sprouting/preparation/cooking steps in an automated fashion. Crock pots or slow cookers, rice cookers, and bread machines are popular kitchen appliances for having the ability to allow a user to insert the uncooked food in the pot early in the day and return to a fully-cooked meal at the end of the day. Yet these machines cannot automatically prepare or cook foods that require movement into and out of fresh liquids, or that otherwise require a controlled movement associated with liquids. While there are a few commercial cookers used by restaurants for cooking beans in large quantities, none of these devices are helpful to the typical consumer in the average household who wishes to prepare a meal involving dry, unprocessed beans or other cooking processes requiring fresh liquids (e.g., they are too large, heavy, complicated, labor-intensive, and/or are not suitable for home use, portable or easily cleanable with standard home washing equipment, etc.).

SUMMARY OF THE INVENTION

An apparatus and method for controlling the movement of a food product in a container are disclosed. The apparatus can be cleanable, portable, and fully automated. It can include a main container for holding the food product and one or more other containers for holding a substance, such as a liquid. The main container can be moved between the one or more other containers so that the food product is immersed in the substance in the other containers. Any of the containers can be heated to heat the food product. This movement of the main container can be used to run fully automated cycles (e.g., sprouting, rinsing, soaking, cooking, cleaning, etc.) that do not require user interaction.

There are a number of embodiments of the apparatus and method. One example is an embodiment in which the apparatus is a portable and/or consumer kitchen apparatus for preparing a food product. The apparatus comprises a first liquid container, a second liquid container, and a main container associated with the first liquid container and the second liquid container, where the main container holds the food product. The apparatus also comprises a mover associated with the main container for controllably moving the food product between the first liquid container and the second liquid container. The apparatus further comprises a heater associated with the second liquid container for heating the food product when the food product is in the second liquid container and a controller in communication with the heater and the mover for controlling the heater and the mover. The controller can also be a control system, and can include multiple controllers or controller parts that can be separate from one another. Additionally, the apparatus comprises a sensor in communication with the controller that communicates to the controller when to control the mover to move the food product to the second liquid container. The sensor can be configured to automatically sense when to move the food product between the first liquid container and the second liquid container. The mover can be configured to move the food product between the first liquid container and the second liquid container responsive to a signal from the sensor.

Another example is an embodiment in which the method is an automated method for preparing a food product in a portable and/or consumer kitchen apparatus. The method comprises receiving the food product into a main container of the apparatus and receiving one or more settings input by a user. The method also comprises moving at least a part of the main container into a first position inside a first liquid container, wherein the food product enters the first liquid container by the moving of the main container into the first position. The method further comprises moving the main container into a second position, wherein the food product enters the second liquid container by the moving of the main container into the second position, and wherein the food product is immersed in a liquid by entering the second liquid container. In addition, the method comprises heating the second liquid container, wherein the heating of the second liquid container heats the liquid and the liquid heats the food product.

The features and advantages described in this disclosure and in the following detailed description are not all-inclusive, and particularly, many additional features and advantages will be apparent to one of ordinary skill in the relevant art in view of the drawings, specification, and claims hereof.

Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIG. 2A is a side view of a lift and rotate apparatus, FIG. 2B is a top view of a lift and rotate apparatus, and FIG. 2C is a side view of a lift and rotate apparatus with an arm mover, according one or more embodiment(s) of the invention.

FIG. 3A is a side view of a lift and slide apparatus, FIG. 3B is a side view of a lift and slide apparatus with an inner basket being raised, FIG. 3C is a side view of a lift and slide apparatus with an inner basket moving to the side, and FIG. 3D is a side view of a lift and slide apparatus with an inner basket being lowered, according to one or more embodiment(s) of the invention.

FIGS. 4A and 4B are side views of a teeter-totter apparatus, according to one or more embodiment(s) of the invention.

FIGS. 5A and 5B are side views of a teeter-totter chute apparatus, according to one or more embodiment(s) of the invention.

FIGS. 6A and 6B are side views of a flip-container apparatus, according to one or more embodiment(s) of the invention.

FIGS. 7A, 7B, 7C, and 7D are side views of a three liquid container apparatus, according to one or more embodiment(s) of the invention.

FIG. 7E is a side view of a single liquid container apparatus, according to one or more embodiment(s).

FIG. 8 is a top view of a four liquid container apparatus, according to one or more embodiment(s) of the invention.

The figures depict embodiments of the invention for purposes of illustration only. One skilled in the art will readily recognize from the following description that alternative embodiments of the structures and methods illustrated herein may be employed without departing from the principles of the invention described herein.

DETAILED DESCRIPTION OF THE INVENTION

I. Apparatus

A. Swinging Arm Apparatus

Figure 1A:
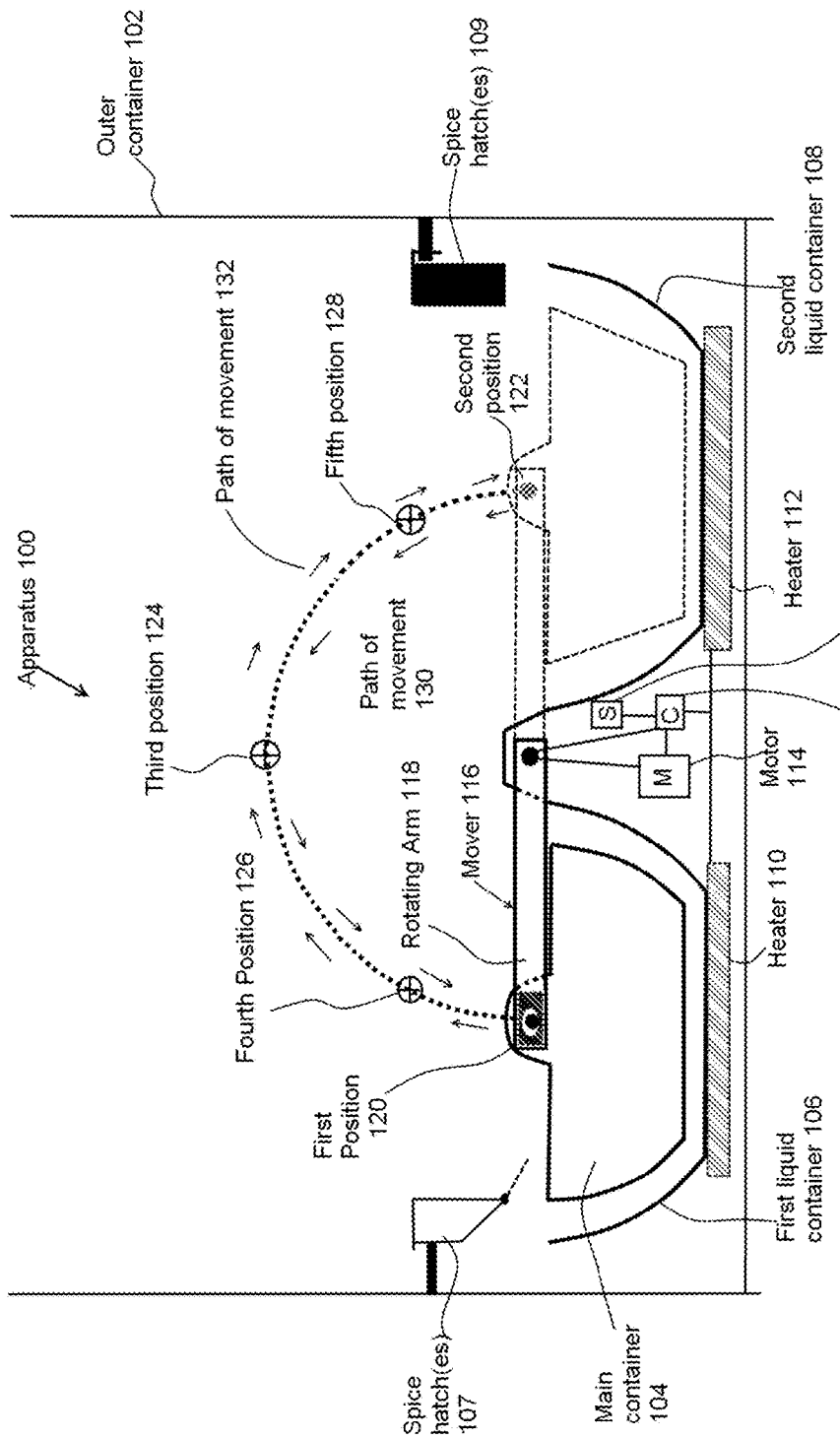
FIG. 1A is a side view of a swinging arm apparatus.

FIG. 1A illustrates a side view of a swinging arm apparatus 100, according to one or more embodiment(s) of the invention. Some embodiments of the apparatus 100 have different and/or additional components than those shown in FIG. 1A, and the other figures. Likewise, the functionalities can be distributed among the components in a manner different than described herein. Certain components and functions can be incorporated into other components of or associated with the apparatus. When describing the embodiments of the invention below, the examples frequently focus on food products, such as beans and rice, though these examples are meant for illustration only, and the invention is not limited to use with any particular food product or item or liquid. In some embodiments, a "food product" means any product meant for human consumption, including ingestion or inhalation. Similarly, where the word "apparatus" is used, it can refer to any of the apparatuses described herein (e.g., in all figures). The description of the components of FIG. 1A throughout generally apply to each of the corresponding components having the same names for apparatuses of other figures.

Referring now to the invention in more detail, in FIG. 1A, there is shown the apparatus 100 with an outer container 102, a main container 104, a first liquid container 106, a second liquid container 108, among other components. The outer container 102 is a chassis, enclosure, or other covering for various components of the apparatus 100, including the main container 104. In brief summary, the main container 104 can be opened via the lid to allow the user to insert food inside, such as dry beans (the outer container 102 can also be a steam-resistant enclosure and/or have a lid or other access method to allow the user to access the main container 104). The user adds fresh liquid (e.g., clean water from a tap) to the first liquid container 106 and to the second liquid container 108. The main container 104 is designed to move within the outer container 102 to move food product contained in the main container 104 into the first liquid container 106 or from the first liquid container 106 to the second liquid container 108. This movement can be used transfer food product to the first liquid container 106 for a soaking process and then to a second liquid container 108 for a cooking process in fresh liquid. In some embodiments, there are two heaters, though there can also be only one heater. In the embodiment of FIG. 1A, two heaters are illustrated. The first heater 110 provides heat to the first liquid container 106 and the second heater 112 provides heat to the second liquid container 108. These heaters 110, 112 provide heat for cooking and other processes requiring heat. The components of the apparatus 100 are each described in more detail below.

The outer container 102 generally contains the components of the apparatus 100. The outer container 102 can be made of various materials, such as metal, plastic, silicone, glass, ceramic, among others, or a combination of these. The outer container 102 can have the shape shown in FIG. 1A, but can also take a variety of other shapes.

The main container 104 generally contains the food product for cooking, etc., in the apparatus 100. The main container 104 can be made of various materials, such as metal, plastic, silicone, glass, ceramic, among others, or a combination of these. The main container 104 can have the shape shown in FIG. 1A, but can also take a variety of other shapes. The main container 104 can be designed to be a basket or other perforated container with a variety of openings through which liquid can drain. In this manner, the main container 104 and the food product it contains can be dunked in liquid in the liquid containers 106, 108 and then removed from the liquid. The liquid that entered the main container 104 while it was in containers 106, 108 can drain through the basket or openings. The openings in the main container 104 can be designed so that they allow liquid to pass through without allowing larger particles (e.g., particles of food product) to pass through. In one embodiment, all or a portion of the main container 104 is a mesh, sieve, grid, or other filter that can prevent passage of most food particles while allowing the passage of liquid. In one embodiment, the openings prevent passage of food particles above a certain size or to retain solid particles of the food product of a pre-determined diameter along a shortest axis of the particles. In another embodiment, the openings prevent larger, substantially whole food particles from passing, but allow smaller solid waste material, such as small stones or grit, sand, and other impurities to pass through to achieve retention of food with elimination of waste material.

The openings in the main container 104 can be sized according to use of the apparatus 100. For example, the openings can be, e.g. 0.01, 0.45, 0.5, 1, 2, 3, 4, 5, 6, 7, or 8 mm in diameter/cross section or larger or smaller (or values in between or ranges including any of these values) as appropriate. In some cases, smaller openings or filtration may be appropriate, for example, for retaining particles above 0.5, 1, 2, 5, 6 10, 20, 30, 40, 50, 75, 100, 200, or 500 microns or larger or smaller (or values in between or ranges including any of these values). Openings may be a mixture of sizes and/or shapes. In some embodiments, openings may be small towards the bottom of the container and larger towards the top, vice versa, or other asymmetrical arrangements to facilitate draining without food loss. In some embodiments, the openings are on the bottom, side, top, or all of the surfaces of the main container 104. In addition, the main container 104 can include one or more opening covers that can be used to close or open the openings to allow liquid not to pass or to pass, depending on desired usage.

The material used for the main container 104 can be a thermally-conductive material for conduction of heat to the food product and/or liquid inside the container 104. In some embodiments, all or part of the main container 104 includes one or more surface treatments or coatings, such as a non-stick coating for easy removal of food product inside and easy cleaning. The main container 104 can also be removable or detachable from the apparatus 100 for separate cleaning or to be used as a serving container to be set on a tabletop or counter for serving the food product. The main container may also be foldable, collapsible, or flexible, for example to allow the container to provide a larger size while filled with liquid, but a smaller size after draining or for reducing size in pre-determined steps during movement of the main container, for example during transfer between containers such as a first and second liquid container. Similarly, the main container can be a larger size when inside the liquid containers, but can be collapsed, squeezed down, made flexible such as a distortable bag or malleable container that is smaller in one sub-region for squeezing through an opening, or reduced in size during movement between the liquid containers to save space in the apparatus. The main container 104 may also be disposable, such as a paper, plastic, or fiber basket or filter. In addition, the main container can be a bag for holding the food. In such embodiments, the liquid containers might be connected to each other via a chute or slide, and the food bag can be slid along this slide from one liquid container to the other, thereby saving the space in the apparatus that would be required to move a full basket of food from one container to another. The food bag can be grabbed by pinchers, hooked or otherwise captured or connected to a mechanism for dragging the bag between containers.

The outer container 102 and/or main container 104 can further be designed to resist pressure and temperatures in the range of 5, 10, 15, 20, 25, 30 psi or more over the existing atmospheric pressure. At 15 psi (107 kPa) pressure boost relative to sea-level atmospheric pressure, for example, water boils at 122° C. (252° F.) and cooking times are reduced up to 70% while preserving nutrients and coloration of food to be cooked. The outer container 102 and/or main container 104 can also be designed to resist the escape of liquids and of gases (other than through a gas outlet or other gas release mechanism in one or both containers 102, 104). One or both of the containers 102, 104 can include an openable and closable lid or other cover. The lid can include a seal to prevent undesired fluid escape. The lid can be a lock-top lid, hinged lid possibly with lock or latch, or other design. In some embodiments, the outer container 102 is a stand or other body that that connects and holds up containers 104, 106, 108, without actually covering or fully covering any of them.

The outer container 102 and main container 104 can also be designed in various sizes. The size dimensions can include the largest dimensions (for example width, height, length, or diameter) of 75 cm, 60 cm, 50 cm, 40 cm, 30 cm, 20 cm, 15 cm, 10 cm, 5 cm, or larger or smaller (or values in between or ranges including any of these values), as appropriate. The main container 104 can be designed to hold a specified amount of content, such as 2 cups, 4 cups, 8 cups, 10 cups 15 cups, 20 cups, 30 cups, or larger or smaller as appropriate. It can be designed to hold a specified number of servings of food, including 1, 2, 3, 4, 5, 6, 8, 10, 15, 20, 30 or more or fewer servings (or values in between or ranges including any of these values), as appropriate. In some cases, the main container 104 can simultaneously hold a specified amount of food product (e.g., at least one portion, such as 50 mL), and a specified amount of liquid (e.g., 3-5 times the amount of food, such as 150-250 mL or more). In some embodiments, the first liquid container 106, second liquid container 108, and main container 104 have a maximum volume of at least 0.5, 1, 2, 3, or 4 liters, and in some cases the volumes are less than 10 liters. In many cases, food product, will expand when soaked. For example, beans may expand to 2-3 times their original weight or size when soaked, so the amount of soaking water can be controlled correspondingly, e.g., from 1, 1.5, 2, 2.5, 3, 3.5, 4, 4.5, 5, 5.5, or 6 times the amount of dry beans or ingredients (or values in between or ranges including any of these values). The main container 104 can also include markings for measuring an appropriate amount of food product and/or liquid to add to the container. In many embodiments, the main container 104 sizing will be increased by an appropriate amount to allow for measurement error, to contain overflow, etc., for example 1%, 2%, 4%, 5%, 10%, 20%, 50%, 100% or other percentage or fixed size (e.g., a fixed size of the specified % larger than the mentioned sizes) larger than the maximum recommended fill level for food and liquid contents.

Inside the main container 104 is a food product to be exposed to a liquid in the first liquid container 106 and/or second liquid container 108. The food product can be any type of food product that might require preparation and/or cooking, such as rice, beans, cereals, grains, vegetables, potatoes, fruits, salt-preserved or dried foods, among others. In some embodiments, the food product includes only solid food products, where the solid food product cooked in the main container is consumed by a user. The liquid(s) can be any type of liquid(s) that might be used in the preparation and/or cooking of the food product, such as water, juice, oils, sauces, batters, coatings, among others. The food product can be immersed in the liquid of a liquid container, and that liquid can thereby be at various levels relative to the food product, depending on the process being conducted by the apparatus 100. For example, where the food product is beans, the liquid can be at a lower level (e.g., not covering any of the beans or only covering some of the beans) for sprouting, though the liquid may be at a higher level (e.g., covering most or all of the beans) during soaking or cooking, in some cases in a different liquid container.

In one embodiment in which a 450 g (one pound) bag of dry beans equals about 6-8 portions of cooked beans (e.g., 3-4 cans of beans), water will cover the beans by about 5 cm, which for 450-500 g of dry beans corresponds to a maximum of 12 dL of water (depending on container 104 shape). The same measurements apply for cooking water as with soaking water for beans (e.g., 12 dL cooking water). For rinsing of the beans (before or after soaking or cooking) or rinsing of the main container, about 6 dL of water can be used. These measurements produce approximately 6-8 portions of cooked beans. For convenient sizing, in some embodiments the first liquid container 106 holds about 3 L, the main container 104 holds about 2 L, and the second liquid container 108 holds about 3 L. In some embodiments, for the simplest design, the user can use the same amount of water no matter what type of food product and how much of the food is added. The simplest approach is to soak and cook in the maximum amount of water to remove the need to measure out specific amounts of soaking and cooking water. In some embodiments, temperature measurement is performed only for safety (to prevent boiling off all water, burning, etc.). By adjusting the size and power of the one or more heating elements (e.g., heaters 110, 112) to create a long-term simmer for the maximum amount of water and food, the need for cooking regulation of temperature is removed. The apparatus 100 can also include a temperature controller (e.g., included in or separate from controller 142) configured to maintain the temperature inside the first or second liquid containers 106, 108 or main container 104 such that the temperature is greater than or equal to 100 degrees Celsius. In some embodiments, the apparatus is configured for rinsing the food product with liquid before soaking/cooking. For example, some embodiments can provide a (possibly separate/extra) liquid container where immersion, and optionally agitation or repeated 'dunking' of the food product, achieves rinsing. In other embodiments, the user rinses the food product and the apparatus is configured to heat the food product when initially started in order to dry it.

The first liquid container 106 holds liquid in which the food product will be placed for the first part of the preparation process (e.g., for a sprouting, rinsing, or soaking process, for example). The first liquid container 106 can be made of various materials, such as metal, plastic, silicone, glass, ceramic, among others, or a combination of these. The first liquid container 106 can have the shape shown in FIG. 1A, but can also take a variety of other shapes. The first liquid container 106 is sometimes larger than the main container 104 so that the main container 104 can be at least partially immersed or fully submerged in the liquid contained in the first liquid container 106. Thus, the food product in the main container 104 can be immersed or submerged in the liquid.

The second liquid container 108 holds the liquid in which the food product will be placed for the second part of the preparation process (e.g., for a soaking or cooking process, for example). The second liquid container 108 can be made of various materials, such as metal, plastic, silicone, glass, ceramic, among others, or a combination of these. The second liquid container 108 can have the shape shown in FIG. 1A, but can also take a variety of other shapes. The second liquid container 108 is sometimes larger than the main container 104 so that the main container 104 can be at least partially immersed or fully submerged in the liquid contained in the second liquid container 108. Thus, the food product in the main container 104 can be immersed or submerged in the liquid. In some embodiments, the first and second liquid containers 106, 108 are spatially disjoint and the mover 116 is configured to move the main container 104 from the first liquid container 106 to the second liquid container 108.

More than two liquid containers can also be included in the apparatus 100. For example, there could be a third, fourth, etc., liquid container. For example, there could be one liquid container for sprouting, one for rinsing, one for soaking, one for cooking, etc. The apparatus 100 can include any one or more of these. In addition, while certain containers are referred to as liquid containers throughout, these containers can contain liquids, solids, gasses, mixtures or distinct layers of these, can be empty, etc.

The containers 106, 108 can be designed to hold any sort of liquid, including water, juice, oils, sauces, among others. One or both of the containers 106, 108 can contain fresh liquid (e.g., fresh water from the tap or other water source) for soaking, cooking, cleaning, etc., which will become used liquid once it is used for preparing the food product or is put into contact with the food. In some embodiments, one or both of the containers 106, 108 are removable from or detachably connected to the apparatus 100. As one example, both containers 106, 108 might be removable for cleaning and also to be filled with fresh liquid that can then be used to prepare the food product. The user can fill one or both containers 106, 108 according to instructions for different meals, based on markings inside the containers 106, 108, etc. In some embodiments, one or both of the containers 106, 108 are connected directly to a water source (e.g., a water faucet or home water pipe) and are connected directly to a water disposal (e.g., a kitchen drain or hose, a kitchen pipe, resting in a sink, attached to a temporary container or removable bottle, etc.).

One or both of the liquid containers 106, 108 can be positioned in various ways relative to the outer container 102 and main container 104. The containers 106, 108 can be separate, as shown in FIG. 1A, or they can be a single container with a division between them or two otherwise connected containers.

One or more heaters can be included in the apparatus, such as heaters 110 and 112 shown in FIG. 1A. There can be one heater for each of the liquid containers 106, 108. Similarly, a single heater can be used to heat both containers. In addition, the heater(s) can be attached or associated with the main container 104. While the heaters 110, 112 are shown beneath the main container 104, they can otherwise be positioned inside the outer container 102 relative to the main container 104 or liquid containers 106, 108. For example, they can be positioned above, surrounding, or to the side of the main container 104 or liquid containers 106, 108, and do not have to be directly in contact with or attached to the main container 104 or liquid containers 106, 108. The apparatus 100 can be connected to a power source via wires. The apparatus 100 can be designed to work with 220V, 50 Hz or 110V, 60 Hz, batteries, gas, or other power sources. In some embodiments, indirect or inductive heating is used. In some embodiments, a heater may be able to lower temperature, such as a chiller that lowers the liquid temperature to more rapidly cool or freeze a food product. One or both heaters 110, 112 can be configured to heat liquid contained in the liquid containers 106, 108 to near boiling.

The apparatus 100 further includes a mover 116 for moving the main container 104. The mover 116, in the embodiment of FIG. 1A, includes a rotating arm 118 and can also include a motor 114 or other mechanism for powering the movement. The motor provides a force to that moves the mover 116 and causes movement of the food product from the first liquid container 106 to the second liquid container 108. In some embodiments, the motor is a linear actuator (e.g., with a traveling nut, spring, piston, etc.). Where the mover 116 includes a linear actuator, the linear actuator can lift the main container 104 in a vertical direction while in some cases keeping the main container 104 in a substantially horizontally-fixed location. In some embodiments, the movement of the main container 104 from the first liquid container 106 to the second liquid container 108 comprises a spatial translation of the main container 104, where the spatial translation is larger than a radius of the main container 104.

The rotating arm 118 of the mover 116 connects to the main container 104 in some manner, such as at the top of main container 104, as is shown in FIG. 1A. As shown in FIG. 1A, the main container 104 can move along a path of movement 132 in one direction and a path of movement 130 in another direction. This movement can be created by moving rotating arm 118 from one side to the other. The main container 104 can move to a first position 120 where the main container 104 is resting inside or partially inside the first liquid container 106. If the main container 104 is moved along path of movement 132, it can eventually reach a second position 122 where the main container 104 is resting inside or partially inside the second liquid container 108. In this manner, the main container 104 and food product contained within can be placed in the liquid inside container 106 and then in the liquid inside container 108. For example, where the food product is dry beans, the dry beans in the main container 104 can be placed in fresh water inside the first liquid container 106 in position 120 for soaking the beans, and then the main container 104 can be moved to position 122 in the second liquid container 108 into fresh water for cooking the beans. In some embodiments, rotating arm 118 is actually two or more arms on either side of the main container 104 designed so that the container 104 can swing between the arms during rotation from one side to the other. In some embodiments, the rotating arm 118 is configured to rotate in a conic section having a horizontal axis. In some embodiments the arm is curved, semi-circular, circular, jointed, flexible, bendable, geared, with multiple or no axels/axes, a slot, a track, a guide along a path of motion, and/or in other shapes or dynamic in structure sufficient for moving the main container between liquid containers.

The main container 104 can also be moved to one or more positions near or between positions 120 and 122. A third position 124 is shown in FIG. 1A, which can be a loading and unloading position for the main container 104. This position can be easily accessible to the user for filling the main container 104 with the food product. In some embodiments, the main container 104 can be removed or snapped into and out of the apparatus 100 for loading uncooked food product and unloading cooked food product. The main container 104 can also act as a food product serving dish. In some embodiments, the main container 104 includes a basket or other container inside the main container 104 that is removable by the user for easy loading and unloading of food product. A fourth position 136 and fifth position 128 are also illustrated. These can be draining positions in which the main container 104 stops just outside and above the liquid containers 106, 108 after being immersed in the liquid to allow excess liquid to drain from the main container 104.

These draining locations can be spatially disjoint from the first and second liquid containers 106, 108. Once drained, the main container can continue along its path of movement 130, 132. In some embodiments, there is an additional one or more positions at which spices are added to the main container 104 or to the liquid containers 106, 108, or these one or more spice adding positions can be one of the first, second, third, fourth, or fifth positions already described.

In some embodiments, the path of movement 130, 132 can include a track or other system along which the main container 104 moves. For example, this could include a ratchet system that allows the main container to ratchet along one or more notches along the paths 130, 132. There can be a notch for one or more of the positions 120, 122, 124, 126, 128 to allow the main container 104 to stop easily at each of those positions without consuming a lot of energy to hold the main container 104 at that position for a period of time. For example, the main container 104 could rest in/on a notch in a ratchet system at the fourth 126 and fifth 128 positions to allow the main container 104 to rest in those positions to drain excess liquid without consuming much energy to hold the main container 104 there. A switch-reversible ratchet, such as used in standard socket wrenches, may be used in some embodiments. FIG. 1A illustrates just one example of a mover 116 design, though a variety of other designs can also be used, including any design that allows the food product to be moved from one liquid area to another liquid area. Some additional mover examples are provided below in FIGS. 1D, 1E, and 1F.

In some embodiments, here using the apparatus 100 as one example but applicable to most/all embodiments described in this application, the invention comprises an enclosure and includes a gas outlet (e.g., on the outer container 102) and/or main container 104 that allows gas to exit from the apparatus 100 to avoid pressure build-up or prevent excessive steam build-up. Such an outlet can also keep gas inside the apparatus 100 to speed up the cooking process. The gas exiting the apparatus 100 may be steam created from the heating of the liquid in the main container 104. The gas outlet can be designed to be openable or closeable by the user, by a controller 142, via the pressure of the gas, via gravity, etc. In other embodiments, the apparatus 100 is designed to trap the steam or gas to retain the liquids and heat in the apparatus 100. For example, the apparatus 100 can include an insulating layer surrounding at least one of the main container 104, the first liquid container 106, and the second liquid container 108, and the insulating layer can help to retain heat and lower apparatus 100's energy consumption. A moveable or flexible partition between areas containing different liquid containers may regulate gas (e.g. steam, cooler air) crossing between them.

In some embodiments, the apparatus 100 includes a mechanism for depositing liquid on the food product. For example, this can be a single-nozzle or multi-nozzle sprayer, mister, liquid atomizer, or other means to evenly or directionally distribute, spray, mist, and/or otherwise control the form of the liquid and location within the main container 104, first and/or second liquid containers 106, 108 where the liquid is delivered. Such a liquid deposition mechanism can be designed to facilitate cleaning of the surface(s) of one or more containers 104, 106, 108, to facilitate sprouting, self-cleaning, to reduce or control foam, distribution of the food, to minimize splashing of the materials already in the container 104, 106, and/or 108, to maintain a controlled temperature environment in the main chamber by regulating the rate of liquid delivery in conjunction with heating or cooling of the chamber, etc. Liquid can also be delivered from multiple locations, at a controlled rate, and/or through one or more nozzles.

In further embodiments, the apparatus 100 includes an air pump, fan, or passive opening ("air circulator") to allow for or regulate the circulation of air within the apparatus 100. The air circulator can be used to circulate air (e.g. hot or cool, stale or fresh air) into or out of the apparatus. The air circulator can be integrated with the outer container 102 or main container 104 (e.g., in the lid of container 102 or 104), or otherwise positioned in or associated with the apparatus 100. Seals may be arranged prevent free circulation of air between the main container 104 and the outside atmosphere. Hence, the contents of the main container 104 may be substantially isolated from the outside atmosphere. However, controlled circulation or inlet of fresh air may be achieved by the use of an air circulator.

The apparatus 100 can further include a display, which can take various forms or locations. The display could be placed on the top, bottom, side, nearby but by/with wired, wireless, or network communication, etc., and there could also be multiple displays. The user can then enter various types of information into the display unit. For example, the user can enter information about the type of food product (beans, rice, vegetables, etc.) and the specific kind of that food product (e.g., black beans, pinto beans, etc.). In some embodiments, the user can enter one or more additional details, including the amount of food product (e.g., pounds, ounces, etc.) or a level of food product (e.g., marked by visible, physical markings inside the main container 110) or an amount of food product added (e.g., ½ cup, 1, 2, 3, 4, or 5 cups, etc.). The user can also enter timing data, such as when the food should be ready, when it was added, when the user will be home to check on it, etc. In some embodiments, the user can further enter different preparation or cooking cycles/recipes (e.g., sprouting, soaking, cooking, warming, etc. by applying a recipe to automate the corresponding process). The display unit can include a keypad, web server, touchpad, WiFi or network connection with software API, voice control unit, mouse, touch-sensitive screen or other mechanism for user manipulation, and a window, screen etc., for display to the user.

In some embodiments, the apparatus 100 also includes a control box that can be located in various locations in the apparatus 100 and can be a microcontroller or other control mechanism 142 that controls various components of the apparatus 100 and that can interact with the display and/or with sensors 141 in the apparatus 100, where such sensors 141 are included. The controller 142 can control heating, draining, liquid immersion, and spice addition to the main container 104. The controller 142 can be configured for user-customized cooking programs for cooking various types of foods. The controller 142 can also regulate immersion in liquids in the first and second liquid containers 106, 108 and to control the heater(s) 110, 112 for soaking and cooking of the food product.

Where the apparatus 100 includes sensors 141, these can be a variety of different sensor types that can be located in various positions. The sensors 141 can be sensors of variety of types, including temperature sensors, weight sensors, pressure sensors, optic sensors, liquid level sensors, liquid flow sensors, ultrasonic sensors, infrared sensors, edibility or cooking status sensors (ECS sensors), scales or weight sensors, piezoelectric sensors, clocks or time sensors including timers, infrared (IR) sensors, barcode sensors, RFID sensors, pH sensors, conductance or capacitance sensors, liquid or atmospheric pressure sensors, imaging sensors, cameras providing an image of the inside of the main container, mechanical sensors to determine the viscosity or resistance to stirring in the main container, voltage or current or energy usage sensors, chemical or odor sensors, or combinations of these or other sensors, or others. In some embodiments, the sensor is a timer for communicating to the controller 142 to move the main container 104 after a pre-determined period of time including at a pre-determined time.

In some embodiments, one or more recipes are stored on a computer-readable storage medium (e.g., a flash memory, RAM, ROM, disks, etc.) that stores instructions (e.g., computer program instructions) that can be executed by a computer processor for operating the apparatus according to the recipe. Thus, there can be recipes for preparing different food products (e.g., beans, rice, etc.) or different types of food products (e.g., black beans, pinto beans), and so forth. The recipe can specify the appropriate temperatures, lengths of time, quantities of food product or liquid, etc., and the device can operate according to the directions specified in the recipe. In some embodiments, a recipe can be stored mechanically, for example, as a set of pre-determined mechanical actions that will occur in response to a series of actions of one or more timers, sensors, switches, etc. As one example, the recipe can specify the temperature of the second liquid container 108 by providing the instructions to the controller 142, wherein the controller 142 applies the instructions to determine a desired temperature of the second liquid container 108 and for controlling the heater 112 to heat the second liquid container 108 to a specified temperature. The recipe can also specify the timing for placing and removing the main container 104 into and out of the first and second liquid containers 106, 108 or the duration in which the main container 104 should sit in or be in contact with containers 106, 108. In some embodiments, the apparatus includes one or more recipe codes comprising instructions for operating or controlling the operation of or by the controller 142 to cook a different type of food product. The recipe codes comprise one or more recipes for cooking different types of beans. In some embodiments, the recipe codes comprise a sub-recipe for degassing beans.

The apparatus 100 can also include one or more spice hatches 109 (e.g., seasonings containers) 107, 109, embodiments of which are also illustrated in FIGS. 1G, 1H, 1I, 1J, and 1K. The spice hatch(es) 107, 109 are one or more cups, chambers, repositories, or seasonings holders, where liquid or dry seasonings or other reagents ("spices") can be added and then released into the main container 104 or into one of the liquid containers 106, 108. Spice hatch 107 includes one or more spice hatches and spice hatch 109 can include one or more spice hatches. In some embodiments, only spice hatch(es) 107 or spice hatch(es) 109 are included in the apparatus, but not both. In other embodiments, additional spice hatches are included in the same or different locations in the apparatus 100. Similarly, spice hatch(es) 107, 109 can be positioned elsewhere in the apparatus 100.

Spice hatch(es) 107, 109 can be in the lid of the main container 104, though they could also be located in other places within the main container 104, liquid containers 106, 108, or in the outer container 102, etc. In some embodiments, one or more of the spice hatches 107, 109 are associated with the main container 104, such as in the lid of the container 104. The user can access the spice hatch(es) 107, 109 by opening the lid of the main container 104 and by opening the lid(s) of the spice hatch(es) 107, 109 to insert spices into the spice hatch(es) 107, 109. The release of spices into the main container 104 can occur by simply opening the lid(s) on the spice hatch(es) 107, 109 once the lid of the main container 104 is closed to expose the spice hatch(es) 107, 109 contents to the main container 104. In some embodiments, opening a mechanical hatch, flap, door, or lid can drop or slide the seasonings into the main container 104, (e.g., a "trap door" mechanism). A seal can also be included on the lid(s) of the spice hatch(es) 107, 109 that seals the spices inside the spice hatch(es). A lid retainer, such as a latch, hook, pull, spring, or other standard mechanical method, can hold the lid of one or more spice hatches in place to trap the spices inside the corresponding hatches. The spice hatches can be fully or partially removable for loading and cleaning.

A spice release control can control the opening of the lid retainer for one or more spice hatch(es) 107, 109, which allow the contents of one or more spice hatches to be released into the inside of the main container 104. Various different control mechanisms can be used. For example, spice hatches can be opened by means of an permanent magnet or electromagnet that does not require a physical connection to the inside of the main container 104, and which can be activated to release the lid of the spice hatch. In general, such a spring/magnet mechanism, a motor, a slider, a valve, and many other means well known in the appliance arts can be used to implement the spice release control. In some cases, spice hatches have lids that open at a pre-determined temperature or pressure.

Spice hatches can be designed such that opening a hatch to the main container 104 allows appropriate transfer of seasonings into the main container 104. For example, steam or steam condensation could be enough to dissolve, liquefy, melt, or solvate seasonings and thereby allow them to flow into the main container 104. Similarly, seasonings can be formulated such that they are solid or viscous at room temperature and humidity, but liquefy or gasify on exposure to the main container 104 and thereby flow or release into the main container 104. A spice hatch's lid isolates the seasonings from the main container environment and keeps the seasonings ready for use until the appropriate point in the cooking process for spice addition to the food product. Salt, for example, could be placed in one of the spice hatches 109 and added late in the final cooking step to facilitate full flavor when cooking food products like beans in order to achieve desired flavor without causing tough skins on the beans. Chili and hot spices that the operator wanted to penetrate vegetables or beans could be added to a second of the spice hatches 109 and then controllably exposed to the main container 104 earlier in the cooking process to soak them deeply into the food. Baking soda or BEANO® could be added to a third one of the spice hatches 107 and then exposed to the main container 104 during a pre-rinse-soak step to neutralize flatulence-inducing nutrients, and yet be substantially eliminated in a rinsing cycle. Hydrophobic coatings, and other easy cleaning materials, may be applied to the spice hatch to keep charged or hydrophilic materials from sticking to the spice hatch.

In some cases, the spices added to one or more spice hatches 107, 109 are contained in a pre-filled canister, packet, or single-use container or spice package that can be used to add a pre-determined mixture of seasonings. For example, in some embodiments, the seasoning package is sealed prior to use, and is punctured by the apparatus to allow fluid flow into and out of the package to transport the seasonings into the main container. In some cases, the seasonings are delivered by controllably flowing liquid through the spice hatch at the desired time or in recipe conditions when the time is right to add some or all of the spices to the main container 104. Commonly, spice packages having pre-mixed liquids or seasonings can be added to a main container 104 by the flow of a carrier liquid, such as water, to flush them into the main container 104 from a pre-prepared reagent container. Reagents, such as salt or salt-water, baking powder or baking-powder infused water, vinegar, and other reagents known to aide in food preparation, can be kept separately from the main cooking or rinsing water. The spices used can be liquid, paste, powder, infusible materials like tea, coffee, saffron, or bay leaves, etc.

More than one spice hatch can be included in the apparatus 100. The various spice hatches can be independently controllable for releasing different spices at different points in the cooking process, or to contain seasonings that need different types of containers for practical handling reasons (e.g. dry spices that mix poorly with liquid seasoning oils). Multiple magnets or mechanical controllers 142 can be included that allow the hatches to be opened or closed independently, e.g., by controlling the opening and/or closing of lids of the spice hatches. In some cases, one or more seals can be used to provide a liquid, solid, or gas tight seal. In some embodiments, the sensors 141 can be used to sense some or all of the following: the presence or level or type of seasonings present in the spice hatches, the rate of inflow of liquid or outflow of liquid or seasonings, the freshness, expiration date, or vendor of the seasonings or seasonings container, to confirm if an inner or outer lid is open or closed partially or fully, to determine if the seasonings or seasonings package present is in accordance with a recipe to be performed by the invention, or to determine a recipe to be performed based on a machine-readable label, e.g., a RFID tag, signature, barcode, data-matrix code, semacode, data glyph, code, tag, other machine-readable label, or other measurement of the seasonings or seasonings package, etc.

Figure 1B:
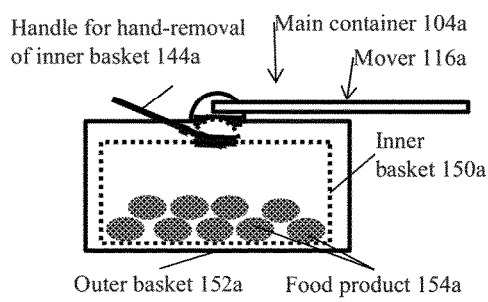
FIGS. 1B and 1C are side views of a main container.

FIG. 1B illustrates a side view of a main container 104a, according to one or more embodiment(s) of the invention. The main container 104a can be used with apparatus 100 or with any of the other apparatuses described herein. The description of characteristics, features, and components of main container 104 above can also apply to main container 104a. Similarly, the characteristics, features, and components of mover 116 can also apply to mover 116a. Main container 104a includes an inner basket 150a and an outer basket 152a. One or both of these baskets 150a, 152a can be perforated/porous, including multiple holes through which liquid can drain without allowing release of the food product 154a inside the inner basket 150a. In some embodiments, the baskets 150a, 152a can have different sized perforations. For example, the outer basket 152a can have larger perforations for easier draining while the inner basket 150a might be a fine mesh for containing food particles. The inner basket 150a can be designed to be removable with handle 144a, which the user can grasp to pull inner basket 150a out of outer basket 152a. In this manner, the user can easily load and unload food product 154a from the inner basket 150a and can replace it in outer basket 152a without having to also remove outer basket 152a. In some embodiments, outer basket 152a and inner basket 150a are both removable as one piece and/or separately (e.g., for cleaning). The inner and outer baskets 150a, 152a can be complimentary in shape or have different shapes. The mover 116a can operate in the same manner as mover 116, including a rotating arm for moving the inner and outer baskets 150a, 152a between liquid containers.

Figure 1C:
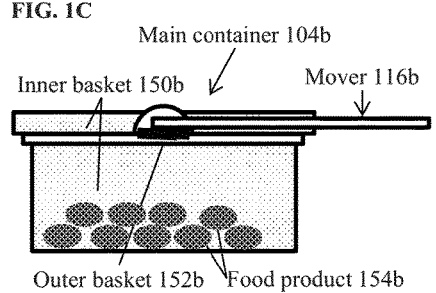

FIG. 1C illustrates a side view of a main container 104b, according to one or more embodiment(s) of the invention. The main container 104b can be used with apparatus 100 or with any of the other apparatuses described herein. The description of characteristics, features, and components of main container 104 above can also apply to main container 104b. Similarly, the characteristics, features, and components of mover 116 can also apply to mover 116b. Main container 104b includes an inner basket 150b and an outer basket 152b. In this embodiment, the inner basket 150b is a perforated basket, including multiple holes through which liquid can drain without allowing release of the food product 154b inside the inner basket 150b. The outer basket 152b is a structure in which the inner basket 150b sits, such as an outer support, ring, or edge on which an outer lip or edge of the inner basket 150b rests to hold the basket 150b in place. For example, the outer basket 152b can be simply on a rim or short ledges to hold the inner basket 150b. The inner basket 150b can be designed to be removable with handle 144b, which the user can grasp to pull inner basket 150b out of outer basket 152b. In this manner, the user can easily load and unload food product 154b from the inner basket 150b and can replace it in outer basket 152b without having to also remove outer basket 152b. In embodiments where the outer basket 152b does not come into contact with food, it may not have to be removable for cleaning. The mover 116b can operate in the same manner as mover 116, including a rotating arm for moving the inner and outer baskets 150b, 152b between liquid containers.

Figure 1D:
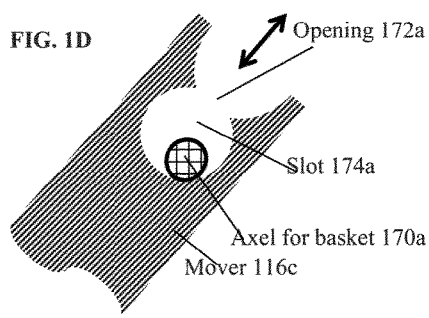
FIGS. 1D, 1E and 1F are side views of a mover.

FIG. 1D illustrates a side view of a part of a mover 116c, according to one or more embodiment(s) of the invention. The description of characteristics, features, and components of mover 116 can also apply to mover 116c. In this embodiment, the mover 116c has an opening 172a into which an axel 170a for the main container can slide until it enters slot 174a where the axel can rest. As the main container moves around within the apparatus, the axel 170a can roll or move within the slot 174a without sliding out of the opening 172a. However, the user can remove the main container by moving the axel 170a out of the opening 172a.

Figure 1E:
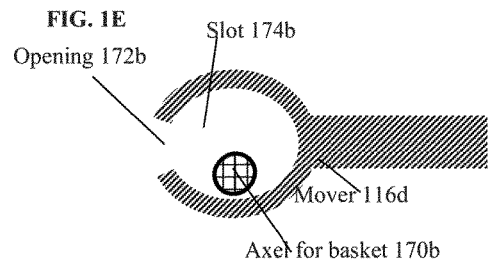

FIG. 1E illustrates a side view of a mover 116d, according to one or more embodiment(s) of the invention. The description of characteristics, features, and components of mover 116 can also apply to mover 116d. In this embodiment, the mover 116d has an opening 172b into which an axel 170b for the main container can slide until it enters slot 174b where the axel can rest. In this case, the slot 174 has general "C" shape. As the main container moves around within the apparatus, the axel 170b can roll or move within the slot 174b without sliding out of the opening 172b. However, the user can remove the main container by moving the axel 170b out of the opening 172b. The curvature, height, and shape of the opening 172b may be greater, less, or differently designed to regulate unintended exit of the axel during normal motion of the mover 116d, or even to release the axel in response to particular motions of the mover 116d.

Figure 1F:
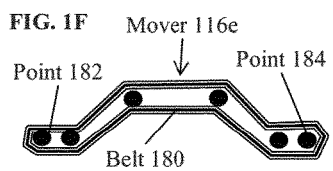

FIG. 1F illustrates a side view of a mover 116e, according to one or more embodiment(s) of the invention. The description of characteristics, features, and components of mover 116 can also apply to mover 116e. In this case, the mover 116e is one or more belts or moving conveyor design where the belt 180 moves around points 182, 184. All or part of the main container can rest on or be connected in some manner to the belt and can move along the belt between two or more liquid containers. In some embodiments a similar belt is on either side of the main container, supporting it by contacts with attachment points on both sides of the main container.

Figure 1G:
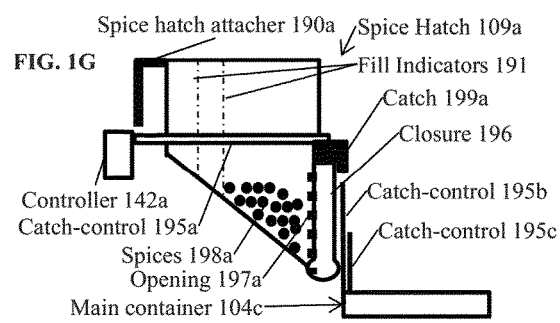
FIG. 1G is a side view of a spice hatch with a closure mechanism.

FIG. 1G is a side view of a spice hatch 109 with a door or closure mechanism, according to one or more embodiment(s) of the invention. FIG. 1G. shows a spice hatch 109a according to some embodiments of the invention. In some embodiments the spice hatch 109a is removable, and may include an attachment hook, arm magnet, slot, or other type of attacher 190a. Like the other containers of the invention, in some embodiments the spice hatch 109a may contain fill indicators or markings 191 for convenient addition of a pre-determined quantity of materials (e.g. spices 198a). In some embodiments the spice hatch 109a has a catch 199a that controls the motion of one or more parts of the spice hatch 109a, for example the closure 196. In some embodiments, a catch-control 195a causes the catch 199a to move or activate, and thereby release the closure 196, and in some embodiments thereby unblocking the opening 197a and releasing the spices 198a to exit from the spice hatch 109a via opening 197a. In some embodiments, the catch 199a is controlled by a controller 142a via catch-control 195a connected to a controller 142a. In some embodiments, the catch 199a is controlled by direct interaction with a main container 104c, for example by a catch-control 195b (e.g. a protrusion) from main container 104c moving catch 199a when main container 104c is moved, thereby causing the release of closure 196, which unblocks opening 197a, which allows spices 198a to fall downward into main container 104c. In some embodiments, the closure 196 provides a guide, ramp, or funnel for the spices 198a as they travel from spice hatch 109a to main container 194c. In some embodiments further motion of main container 104c re-closes closure 196, for example by a second catch control 195c (e.g. a second protrusion) that pushes closure 196 back into the closed position when the main container is further moved, and thus re-engages catch 199a to once again hold closure 196 in the closed position. In some embodiments, catch-control 195a includes an electromagnetic actuator, a push-rod, a cable, and/or a motor. In some embodiments, the catch, catch control, and/or closure are spring loaded and/or contain a motor or other energy source for opening and/or closing the closure. In some embodiments, the closure 196 can be controllably opened and closed multiple times; in others it 196 cannot. In some embodiments the catch 199a, closure 196, catch-control 19a, or other mechanism comprise or are in communication with a motor, spring, or other mechanism for re-closing the closure 196.

Figure 1K:
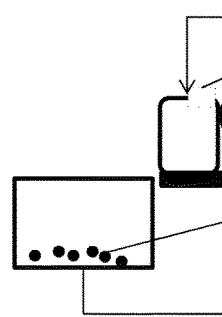
FIGS. 1H, 1I, 1J, and 1K are side views of four positions of a main container and a spice hatch, according to one or more embodiment(s) of the invention.
Figures 1I, 1J:
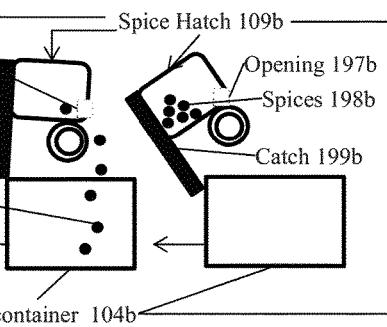
Figure 1H:
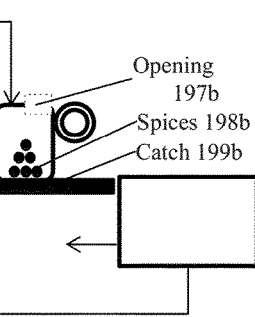

FIGS. 1H, 1I, 1J and IK are side views of four positions of a main container 104 and a spice hatch 109, according to one or more embodiment(s) of the invention. In some embodiments, one or more spice hatches will be activated by the motion of the main container 104 moving the spice hatch to dump spices into the main container 104. In some embodiments, the switch or activation only releases spices responsive to the motion of the food product or container in a specific direction. In some embodiments, the food product container may pass without activating a beveled- or asymmetrical-switch or catch, a sensor, or other one-way activatable mechanism, in the "forward" direction, but a "reverse" direction motion past a pre-determined location would catch the other face or aspect of the switch/catch/mechanism and activate it. FIGS. 1H, 1I, 1J, and 1K show four stages of motion of one such spice hatch 109b, which are organized from the right to left of the page. The spice hatch 109b is controlled by the motion of the main container 104 and releasing spices 198b only when the main container 104 travels in one direction. In FIG. 1H, the main container 1104 contacts the asymmetrically activated catch 199b as it moves to the position of FIG. 1I the catch 199b initiates motion of the spice hatch 109b, and in the position shown in FIG. 1J the asymmetrically positioned opening 197b allows the spices 198b to be released into the main container 104. As shown in FIG. 1K, the main container 104 approaching from the opposite side would engage a different aspect of the catch 199b, or miss/bypass it entirely, and even in configurations where the spice hatch 109b did move the configuration of the opening 197b would retain the spices 198b in the spice hatch 109b and block their release into the main container 104.

B. Lift and Rotate Apparatus

FIG. 2A illustrates a side view of a lift and rotate apparatus 200, according to one or more embodiment(s) of the invention. In this embodiment, the apparatus 200 includes an outer container 202, a main container having an outer basket 252 and inner basket 250, a first liquid container 206, a second liquid container 208, among other components. This embodiment includes a main container with two baskets, though these can also be a single basket, as in FIG. 1A. In this embodiment, the outer basket 252 is a rim for holding the inner basket 250 in place, though other designs can be used, as well. FIG. 2A illustrates how the outer basket 252 can stretch across both liquid container 106, 108 or can be designed as two rims, which can be separate or connected. There is also a counter weight 240 illustrated on the side of the outer basket 252 opposite the side containing the inner basket 250, although in some embodiments no counter-weight 240 is used. In some embodiments, the outer basket is of a size that does not extend over more than one liquid container at time. This weight 240 can be used to balance the weight of the inner basket 250 on the opposing side. In other embodiments, there is no outer basket 252 on the other side opposite the inner basket 250, and instead just a weight 240 is included, or there is no weight, but some other mechanism for balancing is used in some cases. The inner basket 250 includes a handle 244 via which the user can lift the inner basket 250 from the apparatus 200. In the embodiment of FIG. 2A, there are two heaters, heater 210 associated with the first liquid container 206 and heater 212 associated with the second liquid container 208, though there can be more or fewer heaters and they can be positioned differently than shown.

The mover 216 in the FIG. 2A embodiment includes a rotation axel 260 a control 242, and motors 214 and 215, though more or fewer components can be included. The outer basket 252 wraps around and/or is otherwise moveably connected to the rotation axel 260. The rotation axel 260 can act as both a linear actuator and a rotation axel. In some embodiments, it is a threaded pole. In some embodiments, a piston is used. Some embodiments include a sloped slot and pin, or partially-threaded groove/assembly in the control 242, causing a fixed degree of rotation to the outer basket 252 each time the actuator raises the basket to a sufficient level to engage the control mechanism. In some cases, a rotational drive mechanism similar to a Yankee drill or push drill is used. One or both of the motors 214, 215 allow the movement of the outer basket 252 up the rotation axel 260 to remove the outer basket 252 and inner basket 250 from the liquid container 206. The baskets 250, 252 can rest above the liquid container 206 for a period of time that allows liquid to drain from the baskets 250, 252. Then, the baskets 250, 252 can move up the rotation axel 260 via rotation of the rotation axel 260. One or both of the motors 214, 215 can cause rotation of the rotation axel 260, which causes the baskets 250, 252 to move upward along the rotation axel 260. The baskets 250, 252 can move upward to the top of the pole 260, to just above the liquid container 260, or to some point in between. This movement can be controlled by control 242, which can control rotation of the rotation axel 260 along rotation path 230. At some point after the baskets 250, 252 have at least cleared the liquid container 206, the baskets 250, 252 can be rotated around the rotation axel 260 by one or both motors 214, 215, controlled by control 242, until the baskets 250, 252 are aligned above the liquid container 208. In some embodiments, control 242 enables the baskets to lift vertically while simultaneously applying a rotational force that still allows the rotational axel to rotate when the baskets have not yet freed rotational obstructions (e.g., the liquid container 206). The baskets can thus rotate once they are free of obstructions (e.g., baskets try to rotate until they clear the liquid container 206, then they start rotating, but this does not bind up or jam the rotational axis during the time that the baskets are not yet free to rotate). In some embodiments, a slip-clutch, ratchet, or frictional rotation mechanism is used. In some embodiments, part or all of the control 242 is located between the rotation axel 260 and the outer basket 252, near the motor 215, or in other locations. After rotation away from liquid container 206, the baskets 250, 252 can then be lowered into the liquid container 208 so that the food inside the inner basket 250 can be immersed or submerged in the fresh liquid of liquid container 208. Some of the many possible locations for one or more spice hatches 209 are shown in FIG. 2A; spice hatches are described in more detail elsewhere in this application. In other embodiments, the control 242 allows the basket to lift vertically with little or no rotation until the basket(s) are free to rotate, and then allow the baskets to rotate into position for lowering over the liquid container. In some embodiments, all or part of the controller will be located at or near the contact between the outer basket and the rotation axel 260. FIG. 2B illustrates a top view of a lift and rotate apparatus 200, according to one or more embodiment(s) of the invention. FIG. 2B illustrates the inner basket 250 inside the outer basket 252, which are both within or partially within the first liquid container 206. FIG. 2B also illustrations the rotation axel 260 about which the baskets 250, 252 will rotate and translate to move to the second liquid container 208. The counter weight 240 is also illustrated at the side of the second liquid container 208, which will provide balancing of the outer basket 252 while holding the inner basket. The outer container 202 generally surrounds partially or completely these components of apparatus 200. In some embodiments, baskets are within one of the liquid containers but only partially within, above or partially above, or in other locations. For example, the outer basket 252 may be above the liquid container 206, but it positions the inner basket so that part of the inner basket may be contained in the first liquid container for immersion or full submersion in fluids in the liquid container 206 (or container 208).

FIG. 2C illustrates the lift and rotate apparatus 200 with an arm mover, according to one or more embodiment(s) of the invention. In this version of the apparatus 200, the mover 216d includes an arm 288 attached to a lift (e.g. a rod) 281 and/or rotation axel 260 that moves the inner basket between the liquid containers 206, 208. In one embodiment, the mover 216d moves in a "record player" arm fashion. In FIG. 2C, the mover 216d is dynamically connected to the inner basket 250 by an outer basket 252d, though it can also be fixedly or dynamically attached to the inner basket. In many embodiments, an outer basket, such as 252d included in FIG. 2C, can include an attachment point, attachment mechanism, hook, handle, or modification on the inner basket, or other way of connecting the inner basket to the mover. For example, some embodiments can include an outer basket similar to that shown in FIGS. 2A and 2B, or some other mechanism that the mover 216d engages or to which the mover 216d is attached. In FIG. 2C, the mover 216d includes an outer basket engagement device 252d that engages the inner basket 250 or engages a slot, a handle, or other device on the inner basket 250. For example, the mover 216d can include an engagement device 252d that is a slot, and the mover 216d can move horizontally to engage the slot by moving the mover's arm 288 from a resting position to engage the basket by rotating the mover's arm 288. (FIG. 2C shows three positions of arm 288: resting position (centered, solid border), engage position (left, dotted border), and disengage position (right, dotted border)).

Once engaged, the mover 216d can move upward to lift the inner basket 250 out of the liquid container 206. In some embodiments, a motor inside the apparatus moves the mover 216d up and down via a lift 281. In one embodiment, a rod of the lift 281 slides up and down within an opening in the apparatus 200 to move the mover 216d vertically up and down. When the base of the basket 250 is out of the container 206, the mover 216d can swing or rotate around rotational axel 260 toward the second liquid container 208 to move the basket 250 toward the container 208 through a path of motion 230d. Once the basket 250 is above the second liquid container 208, the mover 286 can move the basket 250 down into the container 208. The can be done, for example, by sliding the rod of lift 281 downward into the opening in the apparatus 200 to lower the arm 288 which is holding the basket 250. In some embodiments, the mover 216d continues to move downward even after the basket 250 has reached the bottom of the container 208 and is resting on the bottom. The mover 286 can disengage the basket 250 by continuing this downward motion after the basket 250 has reached the bottom. In some embodiments, the mover 286 disengages by sliding horizontally away from the basket (e.g., toward the container 206). In some embodiments the mover 216 returns to a resting position, such as the center position shown for arm 288 in FIG. 2C.

In some embodiments, the horizontal motion of the mover can be an arc (e.g., as illustrated in path of movement 230e), or in other horizontal motions (e.g., alternate path of movement 230e), for example to minimize the footprint of the apparatus 200 while keeping the baskets over the apparatus to catch drips. In some such cases, this will be achieved by moving the arm in a way that includes rotation, translation, conic sections, and other types of linear and curved motion as described throughout. In one example, the arm can rotate while also "shortening" itself by, e.g., retracting or moving parallel to the length of the arm, so that the basket, while being rotated, is also effectively moved in a compressed arc or straight line. In some cases, the arm rotates but the basket has a different motion, for example rotating to an alternate preferred position or remaining unrotated/with a fixed orientation. In some such cases, a bearing, pivot, motor, or other rotational coupling will allow the basket to stay in a relatively fixed rotational position, or in a constrained horizontal or vertical path, while moving. Some embodiments constrain basket motion by incorporating a track, rail, outer container, or other impediment to rotation or motion of the basket relative to the apparatus or containers 206 and/or 208. In some cases the outer basket/engagement point 252d is not fixed relative to the mover. For example, the outer basket may "slide" along the arm, rotating and/or sliding freely and/or in a controlled manner, powered or unpowered. In some cases, sliding or other motion of the outer basket allows the outer basket to remain over the apparatus while a mover, such as the arm, moves the basket. In some embodiments, the mover contains joints, and in some cases, such joints allow the mover to use rotational motion to move a lifted basket while keeping the basket over the apparatus, e.g., as illustrated in path of motion 230e or a foreshortened path between an arc 230d and line 230e.

Combinations of any or all mentioned movements, control mechanisms, and/or basket handling mechanisms, as well as any others known in the arts, are taught. For example, some portion, such as the first or last portion, of vertical ascent or descent, or of rotation, twisting, moving past the intended position of a basket (e.g., prior to or past the initial or final position) or any other movement of the mover, can be sufficient to engage or disengage a basket, e.g., by connecting via a pocket, catch, hook, depression, pin, magnet, or other mechanism for attaching or detaching the mover from the basket. Different motions can be used for different steps, or different iterations of the same step. For example, one type of motion can be used to engage, and another to disengage, a basket. Note that "engage" and/or "disengage" are understood to mean any change in association with the mover, and that others are possible, including changing the state of the attachment mechanism. In many cases, "engage" or "disengage, for example, can mean to change to a state necessary but not sufficient for release or attachment without subsequent steps, not completely releasing or attaching, rotating or otherwise repositioning the basket with respect to the mover, etc. In some cases, the mover will include a rod, cable, pull, electromagnetic switch or motor, or (electro) mechanical actuator that is activated to engage or disengage the basket. In some embodiments, the engaging or disengaging of the basket will only be possible at certain pre-determined positions, such as by a pin, switch, circuit, channel or fixed guide regulating or restricting the path of the mover. For example, in some cases, all or part of the mover will only be able to raise, lower, twist, or otherwise move in a particular path when at specific locations. Such motion can be required to engage or disengage a basket. In some cases, this movement will provide for consumer safety, such as preventing the basket from disengaging at an inappropriate or unsafe position. Engaging or disengaging can be controlled to happen when the mover arm or associated components close a switch or circuit at a predetermined position, cause movement of the mover or subcomponent by encountering a pin, releasing a spring, or other mechanical means when reaching some location (e.g., releasing a catch, pushing an engage/disengage rod on the mover, opening or closing a claw or release-prevention arm, rotating the basket to a position allowing release from a hook or engagement mechanism at associated with the mover, etc.). Multiple movers are also possible to move the same basket or multiple baskets and/or engage/disengage the basket(s), either through independent action of each mover or multiple movers acting in concert.

C. Lift and Slide Apparatus

FIG. 3A illustrates a side view of a lift and slide apparatus 300, according to one or more embodiment(s) of the invention. In this embodiment, the apparatus 300 includes an outer container 302, a main container having an outer basket 352 and inner basket 350, a first liquid container 306, a second liquid container 308, among other components. This embodiment includes a main container with two baskets, though these can also be a single basket, as in FIG. 1A. In this embodiment, the outer basket 352 is one or more connection points for the mover 316, which connection points attach in some manner to the inner basket 350. In the embodiment of FIG. 3A, there are two heaters, heater 310 associated with the first liquid container 306 and heater 312 associated with the second liquid container 308, though there can be more or fewer heaters and they can be positioned differently than shown.

The mover 316 in the FIG. 3A embodiment moves the inner basket 350 along the paths of movement 330, 332 illustrated. The mover 316 is a linear actuator, according to some embodiments. The inner basket 350 can translate upwards to leave the first liquid container 306 and allow the liquid to drain from the inner basket 350 above container 306. The inner basket 350 can then slide (e.g., translate) toward the second liquid container 308. The inner basket 350 then translates downward toward the second liquid container 308. In this manner, the inner basket 350 containing the food product can move from one container of liquid to another container of liquid to immerse or submerge the food product in the liquid. One example of how the mover 316 could be designed is illustrated in FIGS. 3B, 3C, and 3D, though other designs following the same paths of movement 330, 332 could also be used.

FIG. 3B is a side view of a lift and slide apparatus 300 with an inner basket 350 being raised, according to one or more embodiment(s) of the invention. In the embodiment of FIG. 3B, the mover 316a includes a puller or cable 380 and a lift 381 for moving the inner basket 350a. The cable 380 can attach to the inner basket 350a and to the lift 381. The lift 381 can pull or otherwise manipulate the cable to shorten it so that it creates tension against the connection point to the inner basket 350a to lift the inner basket 350a out of the first liquid container 306a. In other embodiments, there is a one-side-only lift (e.g., that just raises on a single no-pulley cable) or a general linear actuator, a diagonal/not-straight-up path (e.g., the diagonal path shown in FIG. 1F), etc.

The left side of FIG. 3B illustrates the inner basket 350a inside the first liquid container 306a. The right side of FIG. 3B illustrates the inner basket 350a lifted out of the first liquid container 306a. The cable 380 has shortened and the inner basket 350a is now positioned closer to the lift 381.

FIG. 3C is a side view of a lift and slide apparatus 300 with an inner basket 350a moving to the side, according to one or more embodiment(s) of the invention. FIG. 3C shows the next step following FIG. 3B in which the inner basket 350a is moved to one side from being above the first liquid container 306a to being above the second liquid container 308a. The mover 316a can translate the inner basket 350a to the side via a number of mechanisms, including a cable, puller, track, or belt conveyor type mechanism, similar to the mechanism used to raise the basket 350a or the basket 350a and mover 316a could slide along a track to the side. However, a general-purpose robotic arm, a gear and track, piston, linear actuator, or other designs can also be used. In some embodiments, a pulley is used.

FIG. 3D is a side view of a lift and slide apparatus 300 with an inner basket 350 being lowered, according to one or more embodiment(s) of the invention. FIG. 3D illustrates the third part of the movement of FIGS. 3B and 3C in which the inner basket 350a is now lowered into the second liquid container 308a via the cable 380 and lift 381 of mover 316a. The cable is shown lengthened again and the basket 350a is now shown farther away from the lift 381. In some embodiments, the slide/translate path will not be horizontal, but may be curved, sloped, angled, or other paths. For example, the path could be angled downward so that the basket and/or mover slide down towards the second liquid container 308a under force of gravity. In some embodiments, the upward lift mechanism is powered but the translational mechanism relies on the force from gravity operating via a downward path to translate the inner basket's location from the first liquid container 306a to the second liquid container 308a.

D. Teeter-Totter Apparatus

FIG. 4A is a side view of a teeter-totter apparatus, according to one or more embodiment(s) of the invention. In this embodiment, the apparatus 400 includes a main container 404, a first liquid container 406, and a second liquid container 408, among other components. In this embodiment, the main container 404 includes an inner basket 450 that contains the food product 454, which is shown to the left of the figure, immersed (e.g., partially or completely submerged) in the first liquid container 406. The main container 404 can move or pivot around pivot point 420 to move the main container 404 from this first position to a second position that is illustrated in FIG. 4B. In some embodiments the pivot point 420 incorporates or is part of a mover, and in some cases includes a motor or mechanical linkage (e.g. chain, belt, drive-shaft) connected to a motor. The main container 404 can have perforations that allow the liquid to contact the food product and to allow liquid to drain from the main container 404 upon pivoting to the second position of FIG. 4B. The inner basket 450 of the main container 404 may roll, slide, tumble, or otherwise move to change locations in the main container 404 as shown in FIGS. 4A and 4B. For example, a cylindrical or spherical shape may be preferred in rolling, and a (semi-) rectangular shape may be preferred in sliding, possibly aided by a nonstick coating. In some embodiments, the inner basket may be omitted and the food will be held directly in the main container 404 and simply slide from one side to the other within the main container during the motion shown in FIGS. 4A and 4B. In some embodiments, the mechanism relies on the force from gravity operating via a downward path.

FIG. 4B is a side view of a teeter-totter apparatus, according to one or more embodiment(s) of the invention. FIG. 4B shows the main container 404 having moved or pivoted about pivot point 420 to rest the other end of the main container 404 in the second liquid container 408. The food product 454 has slid, rolled, or otherwise moved from one side of the main container 404 to the other, while contained by inner basket 450, so that the food product is now immersed in the liquid of the second liquid container 408. In this manner, the food product can be moved from one liquid to another.

E. Teeter-Totter Chute Apparatus

FIG. 5A is a side view of a teeter-totter chute apparatus 500, according to one or more embodiment(s) of the invention. In this embodiment, the apparatus 500 includes a main container 504, a first liquid container 506, and a second liquid container 508, among other components. In this design, the main container 504 contains the food product 554 and one end of the main container 504 rests in first liquid container 506. The main container 504 can include perforations that allow the liquid to contact the food product 554 through the main container 504. The main container 504 can also include an inner basket 550 that holds the food product 554, similar to inner basket 450, or the food product can sit directly in the main container 504. The main container 504 can further pivot around pivot point 520 to move the main container 504 into a second position (see FIG. 5B). A second main container 504b may sometimes be present.

FIG. 5B is a side view of a teeter-totter chute apparatus 500, according to one or more embodiment(s) of the invention. This figure shows the second position in which the main container 504 has pivoted around pivot point 520 to lean toward the second liquid container 508. In this embodiment, the main container 504 can act as a chute that allows the food product 554 to slide down the main container 504 and exit one end to enter into the second liquid container 508. The main container 504 can be open at the end closest to container 508, or can have a small lip or funnel or other design that will allow the food product 554 (or food product 554 contained in the inner basket 550) to fall into the second liquid container 508. In this manner, the food product 554 can cook or undergo other processes directly within the second liquid container 508. In some embodiments, the container 508 can be removed for easy serving of the food. In other embodiments, the container 508 can include a secondary container inside it, and the mover is configured to move the main container 504 to transfer the food product out of the main container 504 and into the secondary container. In some embodiments, the food product 554 can be contained in an inner basket 550 that slides or rolls along the main container 504, such as a round or cylindrical inner basket with perforations that allow liquid to contact the food. In this case, the inner basket can be removed from container 508 for removal of the food product from the apparatus 500. In some embodiments, the second liquid container 508 may contain a second main container 504b, and in some such embodiments, that second main container 504b will be easily removable from container 508 for removal of the food product 554 from the apparatus 500.

F. Flip-Container Apparatus

FIG. 6A is a side view of a teeter-totter flip-container apparatus 600, according to one or more embodiment(s) of the invention. In this embodiment, the apparatus 600 includes a main container 604, a first liquid container 606, and a second liquid container 608, among other components. The main container 604 can move or flip around a pivot point 620 from the first liquid container 606 to the second liquid container 608. This flipping action can be performed with a motor, spring, or other mechanism. The main container 604 can include perforations that allow the liquid in containers 606, 608 to contact the food product in the main container 604. The food product 654 can settle at one side of the main container 604 in the position of FIG. 6A and can settle on the other side of the main container 604 in the position of FIG. 6B.

In some embodiments, the food product 654 can be contained in an inner basket 650 that slides or rolls along the main container 604, such as a round or cylindrical inner basket with perforations that allow liquid to contact the food. In this case, the inner basket may be removable from container 608 and/or 604 for removal of the food product from the apparatus 600. As applies throughout this application, the inner basket can have other shapes, or be absent, as described for the other figures & embodiments elsewhere in this application.

FIG. 6B is a side view of a flip-container apparatus, 600 according to one or more embodiment(s) of the invention. In this figure, the main container 604 has flipped around pivot point 620 from the first liquid container 606 to the second liquid container 608.

G. Three or More Liquid Container Apparatus

Figure 7A:
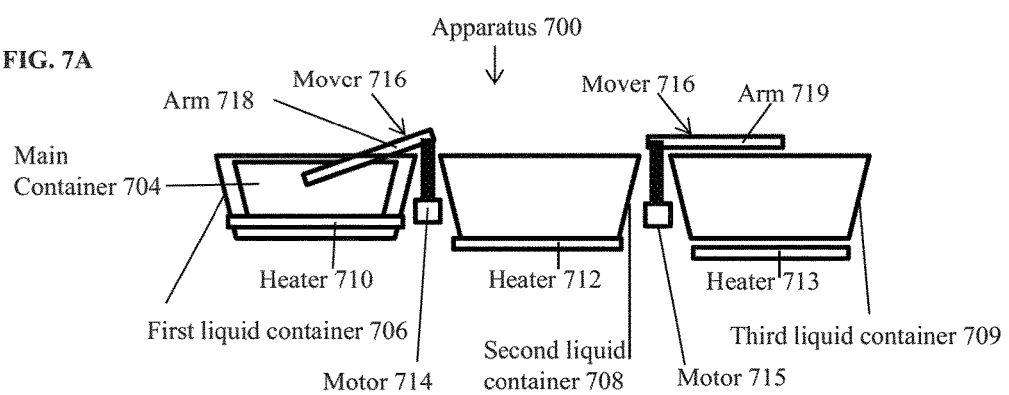
Figure 7B:
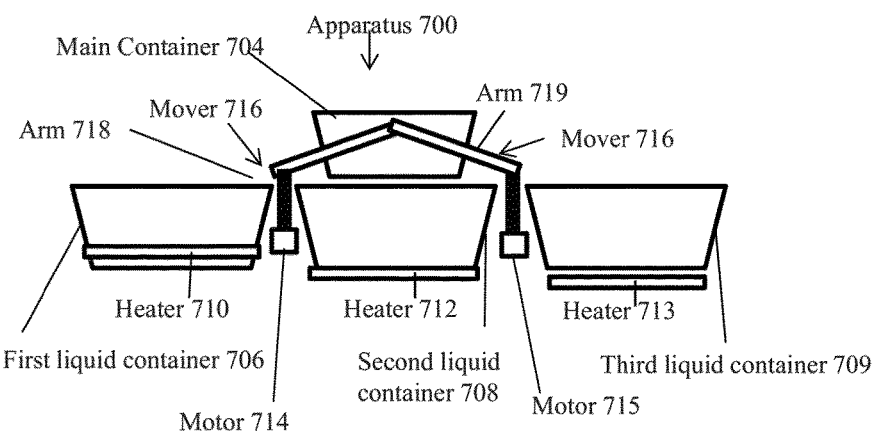

FIG. 7A is a side view of a three liquid container apparatus 700, according to one or more embodiment(s) of the invention. In this embodiment, the apparatus 700 includes a main container 704, a first liquid container 706, and a second liquid container 708, and a third liquid container 709, among other components. In this embodiment, the main container 704 can move between three liquid containers 704, 706, 708 with mover 716. Mover 716 includes two arms 718 and 719 and two motors 714 and 715, though more or fewer component can be used or other designs for the mover 716. The arm 718 can connect in some manner to the main container 704 and can be operated via motor 714 to lift the main container 704 from the first liquid container 706 and to swing it over and into the second liquid container 708. FIG. 7B shows this position.

In addition, each of the liquid containers 706, 708, 709 can include a heater 710, 712, 713, though more or fewer heaters can also be used. The heaters 710, 712, 713 are shown in various different positions associated with the liquid containers 706, 708, 709 to illustrate some of the different configurations that can be used for the heaters. However, the heaters can all be positioned in the same position relative to the respective liquid container, too. Heater 710 is shown wrapped around a portion of the container 706. Heater 712 is shown below and in direct contact with container 708. Heater 713 is shown below and not in direct contact with container 709. The heaters shown in any of the other figures can use any of these positions.

FIG. 7B is a side view of a three liquid container apparatus 700, according to one or more embodiment(s) of the invention. This figure shows the main container 704 in the middle position, over the second liquid container 708. The main container 704 can be moved into container 708 by arm 718, or arm 719 can connect to the main container 704 at the middle position to move it along to container 709 via motor 715.

Figure 7C:
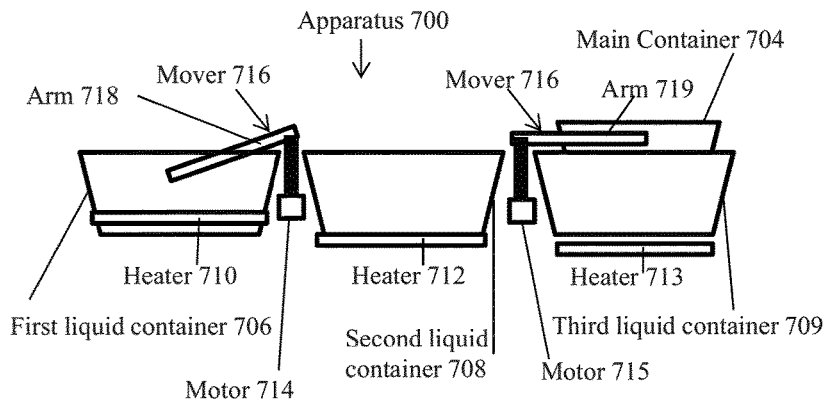

FIG. 7C is a side view of a three liquid container apparatus 700, according to one or more embodiment(s) of the invention. This figure shows the main container 704 positioned over the third liquid container 709 by arm 719 via motor 715. The main container 704 can be immersed in the liquid in container 709. With the design of FIGS. 7A, 7B, and 7C, the food product can be brought into contact with the contents of three containers 706, 708, 709. As one example, the food product could be rinsed in one container, soaked in another, and cooked in the third. Similarly, the food product could be sprouted in one, blanched, steamed or otherwise modified in the others, or could go through a multi-step cooking process with different cooking in different containers. In some embodiments, including any/all described in this application, different types of liquids will be present in different containers, for example oil, water, and air; hot, warm, cold; cold water and boiling oil; water containing different seasonings; water containing different additives, dyes, or fragrances; a combination of these; etc. Such combinations can be applied to embodiments with any number of containers.

FIG. 7D is a side view of a three liquid container apparatus 700a, according to one or more embodiment(s) of the invention. This design includes three liquid containers 706a, 708a, and 709a and a main container 704a that can move between containers 706a, 708a, 709a. In this embodiment, however, the main container 704a translates via a slider (e.g., a linear actuator or other mover 716a design. The main container 704a can move up and out of container 706a, translate (e.g. slide) over to container 708a, move down into and up out of container 708a, translate over to container 709a, and move down into and up out of container 709a. This embodiment also includes heaters 710a, 712a, 713a that can function similarly to the heaters described above. In addition, drip protectors 721 and 723 are shown between the containers 706a, 708a, 709a to catch or direct drops of liquid or food that may run out of the main container 704a as it is moving from container to container. Similarly, the containers 706a, 708a, 709a could all be designed as a single container with dividers, which could also help to catch drops or direct of liquid/food from the main container 704*a* during movement. Such drip protectors can be used in any of the embodiments described throughout this application.

FIG. 8 is a top view of a four liquid container apparatus 800, according to one or more embodiment(s) of the invention. In this design, there are four liquid containers, a first liquid container 806, a second liquid container 808, a third liquid container 809, and a fourth liquid container 811. The main container can move between all of these and be immersed in different liquids or the same liquid contained in these containers. The apparatus 800 is surrounded generally by outer container 802. In this embodiment, the main container includes an inner basket 850 and an outer basket 852. No counter-weight is shown, though one may be used. There can be a handle 844 on the inner basket 850 to allow the user to lift this basket out 850 of the outer basket 852. The mover 816 moves the baskets 850, 852 around from container to container. It can have any of the designs of movers described above. This design can include containers for rinsing, degassing, soaking, cooking, sprouting, blanching, steaming, growing, frying, cooling, warming, etc. It can also include containers for cooking different types of food (e.g., beans and rice).

In general, the illustrative embodiments shown herein are applicable to 2, 3, 4, 5 or more containers. For example, an apparatus similar to FIG. 2 or 8 with three or with five or more liquid containers is possible, and those containers may be equally sized or differently-sized. Similarly, a linear chain, four-square, grid, or other pattern of containers is possible for embodiments similar to those shown in FIGS. 3, 4, 5, 6, 7, with containers equally or differently sized. Two or more inner and/or outer containers are also possible. For example, in FIGS. 2A and 2B, a second inner container could be present in place of (or conjunction with) the weight 240. An asymmetrical arrangement is also possible in FIG. 8 by adding adjacent outer baskets, e.g., in first liquid container 806 (as shown) and simultaneously in liquid container 808 (not shown). Those outer baskets could be rigidly fixed relative to each other and each move their own corresponding inner basket at the same time, or they could operate independently with one or more movers. Embodiments including swinging arm, lift-and-move, teeter-totter, etc., as described herein, may have multiple jointly- or independently-moved inner and/or outer baskets.

H. Single Liquid Container Apparatus

FIG. 7E is a side view of a single liquid container apparatus 700*e*, according to one or more embodiment(s). In some embodiments, the apparatus 700*e* is configured to allow multiple cooking steps such as soaking and cooking to occur within a single liquid container. Apparatus 700*e* includes an outer container 702, a heater 710*e*, a first liquid container 706*e*, possibly one or more spice hatch(es) 709*e*, a lid 762, possibly a mover 716*e*, controller connections 764 (shown as the dashed lines in FIG. 7E), possibly an outer basket 752*e* and/or an inner basket 750*e*, a controller 742, and a main container (e.g., one or both of the outer basket 752*e* and the inner basket 750*e*). Fewer or more components may also be present, including those described in other exemplary embodiments in this application. In some embodiments, the apparatus 700*e* is configured to contain a soaking program in the controller 742 for soaking a food product, a cooking program in the controller 742 for cooking a food product, and the controller receives signals from the sensor(s) 741 and controls the heater to execute the soaking program (e.g., a recipe) and then execute the cooking program (e.g., recipe) to soak and then cook the food product in the first liquid container 706*e*. For example, the soaking and cooking recipes can be used to determine particular parameters of the food product preparation. Where the food product is a particular type of bean, the recipe can be used to determine how long the soaking and also the cooking should occur for that type of bean, what setting the heater 710*e* should be used at during soaking and/or cooking, when the spices should be released from the spice hatch(es), and so forth.

In some embodiments, a mover 716*e* is present, along with an outer basket 752*e* moved by the mover 716*e*. In these embodiments, an inner basket 750*e* can be included and can be removable from the outer basket 752*e* and thus also moveable by the mover 716*e*. In those embodiments, some or all of the food product can be contained in one of the moving baskets, and in the inner basket, as shown in FIG. 7E. In many such embodiments, the controller 742 will control the mover 716*e*, and thus will control the positioning of the basket(s) and the positioning of the food product that is in the baskets. In this way, for example, the controller 742 can control the immersion of the food product in the baskets in a liquid contained in the first liquid container 706*e* and, for example, can dunk the food product in the liquid or remove the food product from the liquid to drain the liquid from the food product. In embodiments where the mover and basket(s) are present, the controller executes the soaking program, executes the cooking program, and uses the mover to drain the food product when the cooking program reaches completion in order to prevent over-cooking or over-exposure of the food product to liquid. In some cases, food product removed from the liquid may be temporarily replaced in the liquid to, for example, maintain temperature or liquid content (e.g., prevent drying out of the food product). In some embodiments, the mover 716*e* is also used to hold the main container out of the liquid before the start of the first cycle (e.g., before the start of the soaking cycle) to prevent soaking from starting until a particular time has been reached. In addition, the mover 716*e* can move the main container out of the liquid in between the cycles, as desired.

The sensor(s) 741 shown in FIG. 7E can be any of the types of sensor(s) described throughout this application and can include a combination of different sensors. For example, one or more of the sensor(s) 741 could be a tilt sensor for detecting if the apparatus 700*e* has been tilted or is otherwise imbalanced. Such a sensor 741 can be used to prevent spillage of the liquid in the first liquid container 706*e* or to detect when a spill has already occurred.

Although controller connections 764 are shown in the figure as direct connections, indirect connection to the controller may also be used (e.g., the mechanical operation of a mover controlled by the controller to control a spice hatch). Furthermore, some or all components may be part of the "controller" system (a.k.a "controller") by being independently controlled (e.g., self controlled) but part of the controller by being part of the designed plan to control the operation of the apparatus 700*e* to produce the food product.

This apparatus 700*e* provides for, among other aspects, the soaking and cooking of a food product in a single liquid container and, when a mover and baskets (outer and/or inner) are provided, for also using the mover to improve the cooking, soaking, and maintenance of the food product's quality. In addition, a mover can also be used to position the basket(s) for more convenient receiving of the food (e.g., to raise the baskets out of the liquid), for activation of spice hatches (e.g., for mechanical interaction with spice hatches to release spices, such as bumping a switch, protrusion, etc.).

Since only a single liquid container 706e is included, the apparatus 700e does not require changing of liquid between the soaking and cooking steps. Instead, the soaking liquid used to soak that food product can be reused as the liquid for cooking the food product.

I. Miscellaneous

In some embodiments of each type of apparatus described in this application, gravity (e.g., sliding down a track) and a downward-path may be used to provide some or all of the power required for translating and/or lowering the inner basket. In further embodiments, the apparatus (e.g. 100) includes a combination of one or more of the concepts described throughout with one or more of a drain with a valve for draining liquid from one of the containers (e.g., containers 106, 108). This liquid can drain into a dump container and the user can throw out this used liquid after the cooking process is complete. In further embodiments, the apparatus (e.g. 100) includes a rotating pot that can pour water into one of the containers (e.g., containers 106, 108) to fill or refill liquid in the containers as needed. This rotating pot can sit above or near containers (e.g. 106, 108), for example, and can be filled by the user. The pot can rotate as needed to pour liquid into the containers (e.g. 106, 108) as liquid is used. Similarly, liquid could drain out of one or multiple containers (e.g. 106, 108) (e.g., into a dump container) and the liquid can be replaced by the rotating pot pouring fresh liquid into one or more containers (e.g. 106, 108) to replenish the liquid.

The motions described herein can be applied to move various components of the apparatus to achieve the same relative motion of the food product and liquid containers. This can be applied to virtually all embodiments. As one specific example, in FIGS. 2A and 2B, the inner basket 250 and outer basket 252 could be held stationary relative to apparatus 200, while the mover mechanism lowers and rotates the first liquid container 206 and second liquid container 208. Thus, the mover can move the food product from the first liquid container 206 to the second liquid container 208 by holding the food product stationary while moving the first and second liquid containers 206, 208. Similarly, In FIGS. 3A, 3B, 3C, and 3D, the inner baskets 350 and 350a could be fixed relative to the apparatus (300) while a mover moves the first and second liquid containers 306/306a and 308/308a downward and across in order to effectively move the inner basket from the first liquid container to the second liquid container. In some such embodiments, other components, such as the heaters 210, 212, 310, 312 may also move with the liquid containers. In other embodiments, the heaters and/or other components may stay fixed relative to the overall apparatus. In some embodiments, movement of the liquid containers may be used to eliminate one or more additional components, such as having a single heater or sensors fixed relative to the inner container and able to heat or sense the first, second, or other liquid containers depending on which container is moved to, for example, a position to contain the inner basket. Thus, the descriptions emphasizing the motion of one component, such as moving one or more inner baskets or food products relative to one or more fixed liquid containers can also include fixing the inner baskets or food products while moving the liquid containers or other components.

In some embodiments, a holding mechanism for holding a main container, inner basket, and/or outer basket will be used to allow keeping the basket or food product in a particular position with minimal energy. For example, one may desire to move the food product from a liquid container to above a liquid container and hold it above the liquid container for an extended period to drain excess liquid back into the liquid container, or to present it for easy removal by a user. In some cases, a basket handle will be more easily reached when the inner-, outer-, or main-container is raised to a position above and/or between liquid containers (e.g. position 126, 124, and/or 128), and in some cases the inner-, outer-, or main-container will release from the mover mechanism for manual removal only when in specific predetermined locations (e.g. position 126, 124, and/or 128). However, many mover components, such as motors, may consume energy while holding a weight against the force of gravity. In some such cases, the apparatus may incorporate a mechanism, such as a one-way ratchet, a lip, ledge, fixed or controllable moving pin, or other resting position where the inner-, outer-, or main-container may rest so that the mover expends little or no energy to resist the full force of gravity, or a mechanical lock, gearing, clutch, electromagnetic locking pin, or other mechanical intervention to hold the weight of the inner-, outer-, or main-container and/or food product. The holding mechanism can be configured for holding the main container (e.g. 104) in a fourth position, where the main container is vertically over the first liquid container (e.g. 106) such that liquid from the main container (e.g. 104) drains by gravity into the first liquid container (e.g. 106), and a fifth position, where the main container (e.g. 104) is vertically over the second liquid container (e.g. 108) such that liquid from the main container (e.g. 104) drains by gravity into the second liquid container (e.g. 108). Similarly, the holding mechanism can hold the main container (e.g. 104) at a position for adding spices to the main container (e.g. 104) or any other predetermined position in the apparatus, and the holding mechanism can provide control of one-way directionality. In some embodiments, the holding mechanism comprises instructions for holding the main container in predetermined positions in the apparatus.

In the swinging arm example, a ratchet at the pivot point may be desirable, as may a locking pin at the pivot point or inserted into or next to the mover (e.g. arm) to lock it into place at the desired angle or location. In the lift-and-rotate examples, a locking pin, clutch, or catch in the controller may be desirable, as may lowering the basket at an intermediate point between the liquid containers, possibly to rest on a drip protector between the liquid containers (e.g., to rest on drip protector 721 of FIG. 7). In the lift and translate examples, such as FIGS. 3A-D, a catch in the mover that controllably locks the outer basket may be desirable, as may lowering the outer basket to rest at an intermediate point drip protector 321. A locking pin, friction brake, clutch, etc. and many other known mechanisms can also be used within the motor, mover/power transmission mechanism, other components of the system to temporarily halt the motion of the mover while holding up the various moved containers, baskets, and food products.

In some embodiments, a "heater," "heating," etc. can be interpreted as having the ability to cool or freeze, removing heat or chilling liquids or food products, etc. In some embodiments, an ability to increase and decrease temperature can be used by a heater to maintain a stable or fixed temperature in a high-temperature environment. In some embodiments, an ability to decrease temperature can be used to create a low-temperature liquid or environment for rapid cooling of a food product, in some cases, before or after it has been subjected to a high-heat environment.

In some apparatuses, methods, and/or embodiments described herein, a design or method to move the main container around for dunking is an optional addition. For example, the main container can be repeatedly raised and lowered within or in-and-out of one or more liquid containers, thereby causing motion of liquid across a food product or container holding food. In some embodiments, this dunking motion is used to achieve one or all of: rinsing or washing of a food product; cleaning of the actual container or part of the apparatus itself; maintaining an approximate temperature for a container or food product by subjecting it to one temperature in a liquid container, removing it from that liquid container to allow partial adjustment towards the temperature outside (e.g. in air or another liquid container) of that liquid container, replacing it into the liquid container for adjustment of the temperature towards the temperature in the liquid container, and thereby attaining an overall an intermediate temperature; mixing food product within a container by the dunking, e.g. due to stirring of the food product by the influence of the liquid in the liquid container. In addition, the motor can be configured to move the main container around to mix the food product and liquid inside the main container.

The liquid container, main container, outer- and/or inner-basket can contain one or more stirring mechanisms. In some embodiments, a stirring mechanism may include a rotating arm or blade, a magnetic stirring bar or magnetic stirring particle(s), baffles/structures for increasing stirring during dunking or liquid flow, or others. In some embodiments, the stirring mechanisms can be limited in force, motion, action, and/or shape to prevent or encourage breakage, damage, or disruption of food product or arrangements, and in some embodiments those food products include limiting the stirring mechanism to prevent the breakage or damage to tender beans.

The spice hatches and sensors can be placed in many locations in most of the embodiments described for our invention in this application. For clarity and brevity, they and their controller connections have been omitted from the many of the figures. However, they can be located in places including contained in the main container, inner basket, outer basket, in the lid of the apparatus, the first/second/third/etc. liquid containers, etc. In some embodiments, it may be desired to provide spices (e.g., seasonings) directly to the food product or indirectly by first adding them to the liquid in a liquid container. Moreover, in some embodiments, the spice hatches and/or sensors can be activated by and/or connected to one or a combination of a mechanical or electronic controller, a mechanical or electronic switch activated by the passage of the food product or a container past a pre-determined point, or the physical contact with a main container, basket, etc. A motor is used in a general sense throughout this application, and may include but is not limited to an AC motor, a DC motor, a servo, a stepper motor, a spring, a mechanical coil, a weight or counterweight, a magnet or electromagnet, or a combination of these.

For brevity, some figures do not show particular components, including one or more controllers, controller components, and/or one or more sensors to avoid unnecessary complication in the figures. However, the figures all provide for and teach the presence of one or more controllers and sensors for many embodiments, and similarly they teach control and/or communication connections connecting some or all of the controllers, sensors, heaters, motors, movers, and other components of the apparatus that perform sensing, motion control, user input or interaction, consume energy, etc. The location of sensors is described in many embodiments throughout this text, and those descriptions and placements apply to the other embodiments given in our text and figures, and the sensors may be placed in other locations regardless of whether they are drawn, or not, in a particular place in a particular figure. Moreover, sensors that sense will generally be in communication with (i.e., connected to in some operative manner) a controller, for example through electrical-, optical-, mechanical-, wireless- and/or other types of connections well known in the appliance and electro-mechanical arts for communicating signals or transmitting information. Similar types of connections will be present for controlling the mover(s), heaters, drainers, spice hatches, cooking programs storage and execution apparatus, user inputs, motors, sprouting components, rinsing components, soaking components, self-cleaning components, etc.

In some embodiments, a controller will be an electronic control, such as a central processing unit or application specific integrated circuit. In other embodiments, a mechanical system, one or more timers, switches, and/or relays, etc. will be used instead or in addition. Those controllers will, in many embodiments, activate and control heaters by regulating the flow of electrical current to the heaters or gas-flow valves supplying energy to the heaters. In some embodiments, the sensors will be connected to the controllers to provide information on time, cooking doneness, temperature, etc, with electrical wires being one common method of providing information to the controller. Spice hatches can commonly communicate with the controller via wires, often indirectly by the state of switches, motors, or other described means that indicate whether a particular spice hatch is open or closed, and similar communication may be used by the controller to activate catches, movers, or other mechanisms to open or close one or more spice hatches. Controllers can be in communication with user interfaces for receiving settings, for example, through a touchpad, dials, speaker/microphone, electrical or mechanical switches, etc. When user feedback mechanisms, such as a display, sound-generators, and/or indicator lights, are present, the controller can be connected to control what is shown on the display, when and what sounds are generated, and the state of indicator lights. The operation of the controller can be enhanced by sensors that indicate the position and state of the one or more main containers, basket, device lid, etc., so that the correct order of steps may be followed and feedback given to the user. In some cases, a "simple" form of controller can be achieved by the designed opening and closing of various switches that are opened or closed by timers, movers, or container positioning, etc, so that the system steps through a series of known states in a known order, for example as following a flowchart or state diagram, where the actual controller is distributed as the set of switches, relays, and/or mechanisms that control the state of the system as it steps from one state to the next. For example, a switch that cuts off power when a swinging-arm mover reaches a pre-defined position, and that activates a timer that will re-activate the mover once the timer counts down, does also provide a form of controller that can be used with the apparatus, even though the components are both distributed and no central processing unit is required. Controllers as mechanical devices are taught for use in our invention.

In some cases heating liquid to indirectly heat a food product is described, however one of ordinary skill will appreciate that those cases also include directly heating the food. In some embodiments, microwaving, inductive heating, and/or infra-red heating are used.

In some embodiments, one or more spice hatches have an opening mechanism set to fully or partially isolate ingredients that are affected by conditions within the apparatus, e.g., extended soaking, heating, and/or exposure to humidity. For example, dry rice, many peas, and some lentil varieties may be best cooked without extended pre-soaking, some spices dissipate or loose flavor, and a spice hatch that holds and isolates them until proper release time thus allows the apparatus to be pre-loaded with these foods, and with liquids, yet delay for an extended period of time before starting a (e.g., cooking) cycle and/or run other cycles while keeping those ingredients primed for use. In some embodiments, a spice hatch will be configured to expose contents (e.g., ingredients) to some conditions but isolate from others, e.g., allow heat in but keep out moisture, to prepare those ingredients for future use (e.g., heated to a safe keeping temperature without exposing to liquid prior to opening a spice hatch, pre-melting certain spices, etc.).

One or more spice hatches (e.g., delay boxes) can also release or expose a food product (e.g., the spice hatch will be "opened"), such as lentils, beans, meat, etc., that was previously kept dry and/or isolated from the surroundings by the un-opened or un-released spice hatch, into a basket, main container, and/or liquid container. The one or more spice hatches can be located above, near, or even immersed or fully submerged within liquid, e.g., cooking liquid in a liquid container, in the apparatus. In some such embodiments, the spice hatch will be opened upon reaching pre-determined conditions by a mechanical switch, bimetal coil, or other standard mechanism that is sensitive to physical conditions (e.g., temperature, pressure, and/or humidity). In some examples, food such as lentils, split peas or rice can be released into liquid only a minute or so before the water boils based on the temperature activation of a mechanically or signal-controlled spice hatch, e.g., a temperature-sensitive release coil. In some embodiments, opening of a spice hatch is performed by a passive or active locking/opening mechanism, such as a passive mechanism can be made out of a material that changes shape or size upon reaching a set point in temperature, pressure, or humidity. This material can be a bimetal, for example copper-steel or brass-steel, or a memory alloy, such as Nitinol, or other bimetal, e.g., those used in the thermostat in simple rice cookers. In some cases, a locking/opening mechanism changes shape or size and thus allows the bottom or the sides of the spice hatch to open and release contents. Spice hatch bottoms or parts may be made from material that changes shape or size at a certain conditions so as to open the spice hatch. Active mechanisms may include a power source and/or a sensing element that senses when a set point of conditions is reached and then delivers an electric signal to a control circuit that determines what action to take. The control circuit can also affect a locking mechanism opening the spice hatch, e.g., so the hatch contents can pour out.

A spice hatch may be free-standing to fit into any pot, chamber, basket, or other structure of the apparatus, or it can be an integral part of a specific cooking container, basket, the main apparatus, and/or a lid of any structure in the apparatus. Spice hatch(es) may be pressure safe or only protect the contents from liquid, temperature and/or moisture, and in some cases can be fully closed or even have the top or a side open, perforated, or otherwise partially exposed. In some cases, such openings may improve loading the spice hatch, cleaning, and/or delivering its contents.

II. Method

A. Apparatus Method

Figure 9:
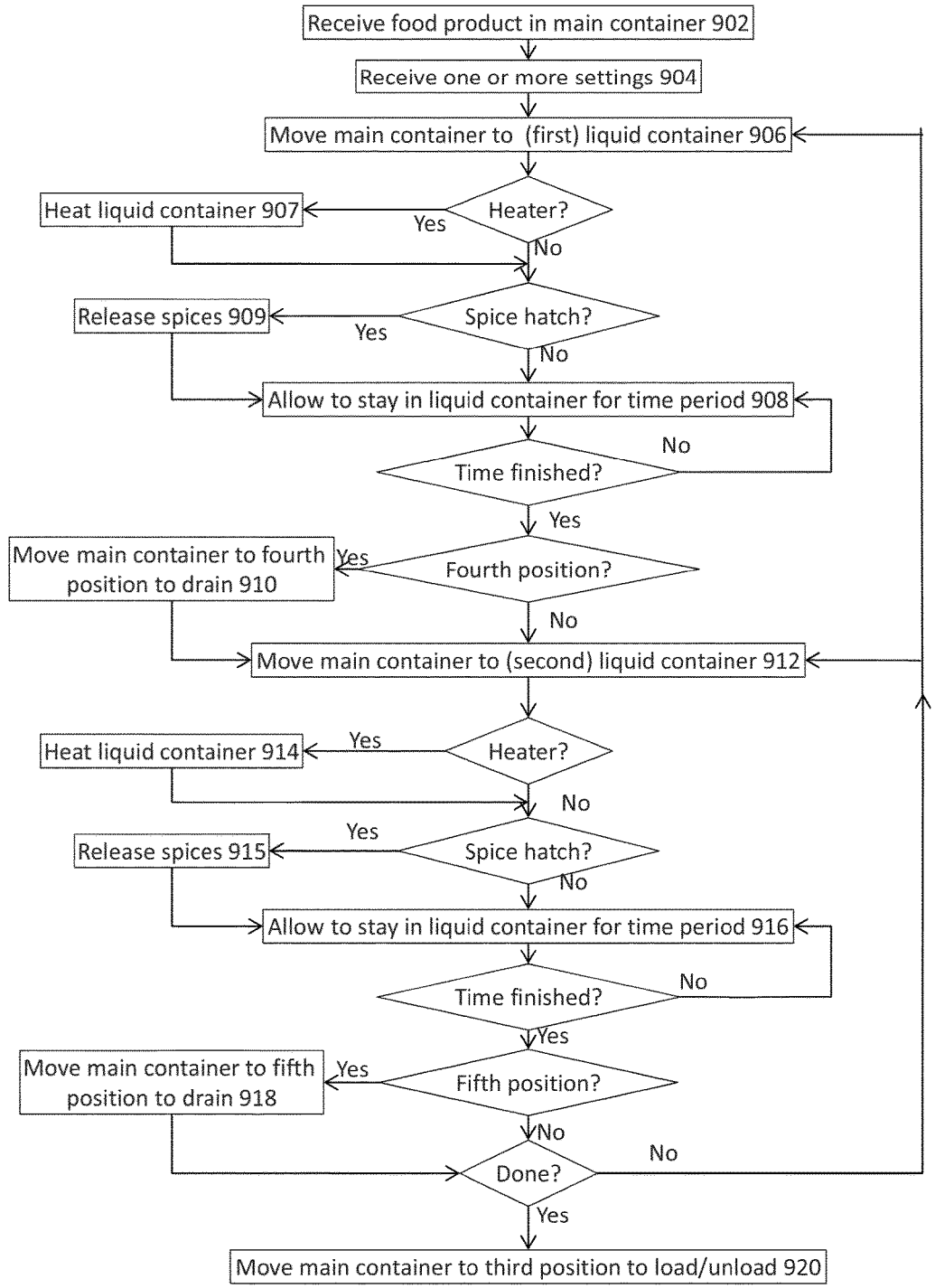
FIG. 9 is a flowchart illustrating movement of a food product, according to one or more embodiment(s) of the invention.
Figure 10:
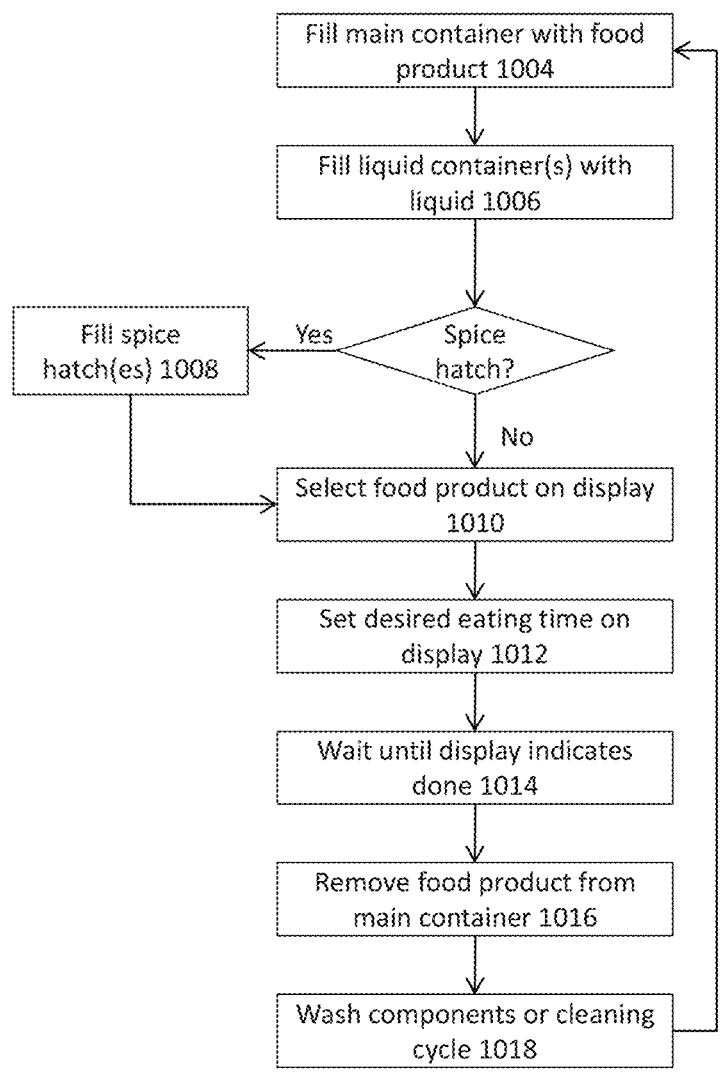
FIG. 10 is a flowchart illustrating use of the apparatus by a user, according to one or more embodiment(s) of the invention.

FIG. 9 is a flowchart illustrating movement of a food product, according to one or more embodiment(s) of the invention. The method illustrated is an automated method for preparing a food product (e.g., dry beans or another food) in a portable and/or consumer kitchen apparatus. FIGS. 9 and 10 provide examples of steps that can occur in the method, though more, fewer, or different steps can occur or the steps can occur in a different order. In some places the method is described in terms of minutes but it will be understood that "minutes" or time also includes the substitution of other criterion, such as measurements from sensors (e.g. 241a-c) or signals from the microcontroller, e.g., based on level of fullness or weight of the main container, amount of liquid (rate of delivery or removal may vary), level of done-ness or completion for a stage in a recipe, appearance or degree of green in a sprouting/growth recipe, various sensor (e.g. 241a-c) measurements, etc.

The method includes receiving 902 the food product into a main container of the apparatus. In embodiments in which the main container is removable, the main container can also be received 902 into the apparatus. For example, the main container can be received 902 in the third position in the apparatus, which can be a position for loading and unloading the main container or the food product in the main container. The method also includes receiving 904 one or more settings input by a user. In some embodiments, the settings are for one or more cycles or at least two cycles, including a food product sprouting cycle, a food product rinsing cycle, a food product soaking cycle, a food product cooking cycle, an apparatus self-cleaning cycle a cooling cycle, a warming cycle, and a frying cycle. The method can further include automatically starting a new cycle upon completion of another cycle. As one example, the method can include receiving 904 settings for a soaking cycle and a cooking cycle for the food product, where the cooking cycle can start in response to the soaking cycle coming to an end. A variety of other cycles can start one after another or at the same time, as desired. This series of one or more cycles may be part of a recipe.

The method further includes moving 906 at least a part of the main container into a first position inside a first liquid container. The food product enters the first liquid container by the moving of the main container into the first position. In some embodiments, the food product is immersed (e.g. partially or fully submerged) in a liquid by entering the first liquid container. Where there is a heater associated with the first liquid container, the method can include heating 907 the first liquid container. If not, the method continues to the next step. Where there are one or more spice hatches included in the apparatus, the spices or other substances (e.g., degassing components, etc.) can be released 909 into the main container and/or liquid container. The food product can be allowed 908 to stay in the first liquid container for a specified time period. For example, where this is a soaking cycle, the food product can be allowed to soak in a liquid in the first liquid container for a period of time. In some embodiments, a specified time period can be until pre-defined conditions are met, and hence variable in the actual wall-clock time used. As one example, in some embodiments of the preceding step, pre-determined conditions for a time period include sufficient soaking of a food product detected by a soaking sensor attached within the apparatus. When this time is up, the method can move to the next step. In embodiments in which there is a fourth position for the main container, the method further includes moving 910 the main container into the fourth position (e.g., a draining position) for allowing liquid to drain from the main container. This fourth position can be directly above the first liquid container or otherwise positioned to allow liquid to drain back into the first liquid container.

The method additionally includes moving 912 the main container into a second position. In some embodiments, this movement is in response to reaching the end of the specified time period for being allowed 908 to stay the first liquid container. The food product enters the second liquid container by the moving of the main container into the second position. The food product is immersed in a liquid by entering the second liquid container. Where there is a heater included for the second liquid container, the method also includes heating 914 the second liquid container. The heating of the second liquid container heats the liquid and the liquid heats the food product. For example, where this is a cooking cycle, the heating 914 can cook the food product in the second liquid container. In some embodiments, this heating 914 also occurs when the main container is in the first liquid container (e.g., for a heated soaking cycle or quick soak, degassing, for a heated sprouting cycle, etc.). Where there are one or more spice hatches in the apparatus, the method also includes releasing 915 the spices or other substances into the main container or into the first or second liquid container. In some embodiments, the main container can be allowed 916 to stay in the second liquid container until a specified period of time has passed.

Where there is a fifth position, when the time period has passed, the method then moves 918 the main container into a fifth position (e.g., a draining position) for draining liquid from the main container. This fifth position can be directly above the second liquid container or otherwise positioned to allow liquid to drain back into the first, second, or other liquid container(s). If there are additional cycles to run and/or additional liquid containers into which the main container can be placed, the process can restart by moving 906 or 912 the main container into the next liquid container. This can be automatic, without requiring any user intervention. In some embodiments, the method ends by moving 920 the main container into a third position (e.g., a loading/unloading position) for unloading the main container or a portion thereof from the apparatus or for unloading the food product from the main container. Each of the steps of the method (except perhaps for the receiving steps) can be fully automated without requiring any input or interaction with a user. The order of some steps may also be changed. For example the order of receiving food product 902, receiving settings 904 may be varied or done in parallel; pre-heating may be used to heat liquid containers 907, 914 earlier in the method, spices may be added at varying and/or multiple times, etc. In some embodiment, the method is a sprouting method and steps of operating the apparatus are performed to sprout the food product.

B. User Method

Referring now to FIG. 10, there is shown a flowchart illustrating the user method of operation of the apparatus, according to one or more embodiment(s) of the invention. The user fills 1004 the main container with the food product to the correct level (e.g., a pre-determined amount, as determined by a measurement line on the inside of container, or by a sensor, etc. (e.g., about 2 cups (4 dL)). The user fills 1006 one or both liquid containers to a measurement line with fresh liquid (e.g., about 10 cups (2 L)). In embodiments where there are one or more spice hatches in the apparatus, the user may fill 1008 one or more spice hatches. The user can make sure the display still displays the start message. Steps 1004, 1006, and 1008 can occur in any order. In some embodiments, the user can take advantage of removability of the liquid containers to fill one or more away from the apparatus, and then return them to the apparatus. For example, the user can remove a liquid container, fill it at a kitchen sink, and then return it. In such embodiments a carry-handle may be built into the liquid container. In some embodiments the spice-hatches are loaded with sufficient spices for multiple uses, so a user need not always fill them.

The user may enter the parameters for the apparatus. For example, the user can select 1010 the particular food product on the display, confirms, and the message on the display shows the food (e.g., "BLACK BEANS"). In some cases the device may auto-select settings, for example by an optical, RFID, or other sensing of the type of food and/or spices added. As another example, the time symbol (e.g., "00 00") can appear on the display, and the user can set 1012 the desired eating time (e.g., in hours and minutes from the time right now), or desired time until starting, by adjusting the time on the display. The user may confirm any or all settings. One or messages will be displayed for the cycle (e.g., "BLACK BEANS"+"RESTING"+"16 30", which is the time left to the end, in this example 16 hours and 30 minutes). Once the timer counts down to zero, the apparatus can switch to low-heat or warming mode to keep the meal warm for up to several hours or days, and the display can indicate this (e.g., "COOLING aa bb", where aa bb is the time since the low-heat mode was entered). In such keep-warm modes, special programs to keep food sanitary, such as heating to or above 60 C or 140 F occasionally or continually, may be employed. The user can wait 1014 until the display indicates this cycle (e.g., "LOW HEAT aa bb"), which indicates that container is sufficiently cooled off to be removed. The user can then remove 1016 the food product (or remove the main container holding the food product). In some embodiments, the main container can then be used as a serving dish. Afterwards, the components of the apparatus can be washed 1018 and one or more components placed in the dishwasher. The user can also put the container back into the apparatus to run a cleaning cycle 1018. The user can then re-start a new cycle with a new food product, as desired. This is just one example of steps that can occur in the method, though more, fewer, or different steps can occur. The order of some steps may also be changed. For example the order of filling with food product 1004, filling liquid 1006, filling spice hatch 1008, entering input 1010, entering eating time 1012, may be varied or done in parallel, spices may generally be added at varying and/or multiple times, etc.

III. Other Designs and Uses

A. Multi-Chamber Apparatus

A variety of other designs and uses are possible for the apparatus. Some designs of the apparatus include multiple main containers for coordinated cooking of different food products under different or distinct conditions in each chamber. For example, beans could be prepared in one container and rice in the other. In the multi-chamber design, the main container can be replaced by two main containers that may allow separate or joint cooking and/or that may be designed for snapping into and out of the apparatus by the user according to his cooking needs. Both chambers can be thermally connected such that when the left chamber is heated the right chamber is also heated, or they could be heated separately with separate heaters. In some cases a divider can be added to a main container to create two, possibly temporary, compartments serving as dual main containers. In some embodiments the containers can have two or more liquid containers for receiving liquid independently in the chambers. Each chamber can have one or more independent spice hatches. A microcontroller, mechanical controller, and/or various sensors can be used to independently operate the two chambers. Hence, the apparatus provides for one, two, three, four, five, or more main containers some or all of which may be independently or only jointly removable, drainable, liquid receivable, etc., with independent sensors and so forth.

B. Sprouting, Steaming, Blanching, Frying

The apparatus can be designed to allow sprouting of some foods, such as for sprouting of beans, legumes, plants, etc. In some embodiments, sprouting includes growing of plants of various types. Moisture, warmth, and in most cases, indirect or artificial sunlight may be needed for sprouting. The food to be sprouted can be placed directly into the main container or into one or more removable baskets placed in the main container. The apparatus can include a sprouting cycle or setting that allows the user to set the apparatus to sprout the food product (e.g., for a specified period of time, such as for 1 day, 2 days, 3 days, etc. The user can also set the apparatus to sprout for a set period of time and then automatically begin cooking after that period of time. The apparatus can be designed to allow the food product to receive light for sprouting (e.g., where the lid of the main container and/or outer container is transparent or allows light to pass through, where there is a growing light inside one or both containers, etc.). There can also be a grow light attached to the main container or outer container for providing light to the food product inside the main container. The apparatus can be designed to allow for air circulation and to provide moisture during the sprouting process. Sensors can be used to ensure the moisture level is appropriate for sprouting. The apparatus can further include an agitator to mechanically agitate or shake the main container or the floor of the main container, or the container itself can be moved to provide agitation for circulating the food product or liquid in the main container. The apparatus can also include an air circulator associated with the main container for circulating air inside the main container. The apparatus can also be used to provide warming or temperature management for sprouting. The apparatus can be further designed to control the environmental conditions inside, including the pressure, temperature, humidity, etc., to maintain the appropriate or optimal sprouting conditions for the particular food product (e.g., via the microcontroller and sensors). The apparatus can further include an immersion-regulation controller for controlling the amount of immersion of the main container in the moisture to sprout the food product.

The apparatus can also be designed for blanching, steaming, sterilizing, and/or frying food. For example, there can be separate settings or buttons of the device for these functions. The blanching function can be designed to do a quick boil or to quickly dip the food in hot water. For example, for vegetables, this could be designed to cook in a manner that does not penetrate the vegetables all the way through so that they are still crunchy, but cooked on the outside. The vegetables or other food or plant item can be placed directly inside the main container for blanching or steaming, or there can be one or more insertable baskets inside the main container in which the food to be blanched or steamed can be placed. The frying function can be designed to lower the food into heated oil in the second liquid container, and remove it when an appropriate time period has ended. In some cases that time period can be when specific conditions, such as done-ness level as sensed by a sensor, are achieved. In some cases, fried beans, legumes, or other foods can be made by utilizing water into a first liquid container and oil into a second liquid container. Again, the environmental conditions inside the main container can be controlled for steaming, blanching, sterilizing, and/or frying food. In addition, the apparatus can further be used for sous-vide, a French style of cooking food under vacuum with the food in a airtight plastic bag in a water bath for a period of time (e.g., 72 hours) at an accurately-determined temperature that is much lower that is normally used for cooking (e.g., 60° C. or 140° F.). The food in the airtight plastic bag can be placed in one of the liquid containers. It can be moved to different liquid containers or be raised and lowered from the liquid container to adjust the temperature of the food, according to some embodiments. In some embodiments an inner or outer basket may be, or may be used as or in place of an airtight plastic bag. In some embodiments an inner or outer basket may be airtight, flexible, vacuum-sealable, may designed to be bled of air or allow easy air removal, etc.

C. Cleanability and Portability

Many of the principal components of the apparatus (e.g., the main container(s), liquid containers, and other surfaces in liquid and solid contact with the main container(s) during cooking) can be removed for cleaning either manually or for placement in a standard home dish-washing machine to maintain the hygienic state of the apparatus. In some embodiments, all parts that come into contact with the food product can be removable. Components can also be sized to fit inside a standard home dish washing machine, including in the size dimensions described above, and can be coated or designed with materials that are dishwasher-safe. In some embodiments, the weight of each removable component will be suitable for easy detachability, washability, and ergonomic home use, e.g., with a weight not more than 50, 25, 20, 15, 12, 10, 8, 5, 4, 3, 2, 1, or 0.5 pounds (or any values in between or any ranges including these values), and in many cases a designed to fall at or below OSHA guidelines for single-person manual lifting. In practical uses, "detachable" or "removable" means easily removed from the device without resorting to general-purpose tools, and also means easily re-installed without those tools.

The apparatus can be further designed to be "portable," meaning it can be moved or carried by a single home user and can be placed on a standard home kitchen countertop with components that can be placed in a home dishwasher, etc. The device can be designed to minimize the device footprint or counter/shelf-space in a kitchen. It can be powered for use with standard household outlets and can follow appliance guidelines for standard household use. In some cases, the apparatus may incorporate portable power, such as solar cells and/or batteries to maintain partial- or full-functionality with intermittent or no connectivity to external power sources for an extended period of time. Physical design can also be adjusted for storage, portability, and placement. In some embodiments, the apparatus is a consumer or home kitchen appliance apparatus that is non-industrial in nature or for use in non-industrial kitchens.

The above description provides various examples of the apparatus and methods. Various other components could be included in the apparatus and various other steps in the methods, including any of components/steps and any of the different designs of component/steps described in U.S. Provisional Application No. 61/261,342 filed on Nov. 15, 2009, U.S. Utility patent application Ser. No. 12/945,891 filed on Nov. 15, 2010, International Application No. PCT/US10/56636 filed on Nov. 15, 2010, and/or U.S. Provisional Application No. 61/370,466 filed on Aug. 4, 2010, which are each incorporated by reference herein in their entireties for all purposes, including any appendices or attachments thereof.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments. The scope of the invention is to be limited only by the following claims. As used herein any reference to "one embodiment" or "an embodiment" means that a particular element, feature, structure, or characteristic described in connection with the embodiment is included in at least one embodiment. The appearances of the phrase "in one embodiment" or "some embodiments" in various places in the specification are not necessarily all referring to the same embodiment.

We claim:

1. An automated method for preparing a food product in a portable apparatus, the method comprising:
   receiving a food product into a main container of the apparatus, the food product comprising dry beans;
   receiving at the apparatus one or more settings input by a user;
   moving, by the apparatus, at least a part of the main container into a first position inside a first liquid container containing a first liquid, wherein the food product comes into contact with the first liquid of the first liquid container;
   moving, by the apparatus, at least a part of the main container into a second position inside a second liquid container containing a second liquid, wherein the food product comes into contact with the second liquid of the second liquid container; and
   heating the second liquid container while at least a part of the main container is inside the second liquid container, wherein the heating of the second liquid container heats the second liquid and the second liquid heats the food product.

2. The method of claim 1, wherein the method is a method for cooking the dry beans, and wherein applying heat to the dry beans and the liquid further comprises applying heat for cooking the dry beans.

3. The method of claim 1, wherein receiving one or more settings further comprises receiving settings for at least two cycles selected from a group consisting of: food product sprouting cycle, food product rinsing cycle, food product soaking cycle, food product cooking cycle, and apparatus self-cleaning cycle, and wherein the method further comprises automatically starting a new cycle selected from the group of cycles responsive to completion of a cycle.

4. The method of claim 3, further comprising automatically starting a new cycle selected from the group of cycles responsive to completion of a cycle.

5. The method of claim 1, wherein receiving one or more settings further comprises receiving settings for a soaking cycle and a cooking cycle for the food product, wherein the cooking cycle is programmed to begin automatically after completion of the soaking cycle.

6. The method of claim 5, wherein the soaking cycle comprises the moving of the main container to the first position, which immerses the food product in the first liquid contained in the first liquid container to allow the food product to soak in the first liquid for a specified time period.

7. The method of claim 6, wherein the moving of the main container to the second position occurs in response to an end of the specified time period being reached, and wherein the cooking cycle comprises the heating of the second liquid container, the heating cooking the food product in the second liquid.

8. The method of claim 1, further comprising activating one or more spice hatches associated with the apparatus to release spices into the main container or the first or second liquid container for seasoning the food product.

9. The method of claim 1, wherein each of the steps of the method, except for the receiving steps, are fully automated without requiring any input or interaction with a user.

10. The method of claim 1, wherein the method is a sprouting method comprising steps of operating the apparatus to sprout the food product.

11. The method of claim 1, further comprising moving the main container to a third position comprising a draining location that allows the first liquid to drain from the main container into the first liquid container, the draining location being separate from the first and second positions.

12. An automated method for preparing a food product in a portable apparatus, the method comprising:
   receiving a food product into a main container of the apparatus;
   receiving at the apparatus one or more settings input by a user to perform a soaking program and a cooking program;
   executing, by the apparatus, the soaking program in the apparatus in which the food product is soaked in a first liquid in a first liquid container for a period of time;
   executing by the apparatus the cooking program in which the food product is cooked in the first liquid in the first liquid container for a period of time, the cooking program executed in response to the apparatus detecting that the period of time has finished; and
   heating the first liquid container, wherein the heating of the first liquid container heats the first liquid and the first liquid heats the food product.

13. The method of claim 12, further comprising releasing spices from one or more spice hatches into the main container or first liquid container at a specified time.

14. The method of claim 12, further comprising moving the main container into or out of the first liquid container one or more specified times before, after, or during the soaking or cooking of the food product.

15. The method of claim 12, wherein each of the steps of the method, except for the receiving steps, are fully automated without requiring any input or interaction with a user.

16. The method of claim 12, wherein receiving at the apparatus one or more settings input further comprises receiving a time from the user at which the user would like the cooking of the food product to be completed.

17. The method of claim 16, wherein a cooking cycle begins after a delay time such that the cooking of the food product is completed at the time received from the user.

18. The method of claim 16, wherein a soaking cycle begins after a delay time such that the cooking of the food product is completed at the time received from the user, and wherein the food product is immersed in the first liquid only after the delay time has ended.

19. The method of claim 12, further comprising:
   moving, by the apparatus, at least a part of the main container into a second liquid container containing a second liquid, wherein the food product comes into contact with the second liquid of the second liquid container; and
   heating the second liquid container while at least a part of the main container is inside the second liquid container, wherein the heating of the second liquid container heats the second liquid and the second liquid heats the food product.

20. The method of claim 12, wherein receiving a food product comprises receiving dry beans into the main container, and wherein executing the soaking and cooking programs comprises soaking and cooking the dry beans to produce cooked beans in the apparatus.

* * * * *